United States Patent [19]

Schloemer et al.

[11] Patent Number: 5,793,842
[45] Date of Patent: Aug. 11, 1998

US005793842A

[54] SYSTEM AND METHOD OF CALL ROUTING AND CONNECTION IN A MOBILE (REMOTE) RADIO TELEPHONE SYSTEM

[76] Inventors: Jerry R. Schloemer, P.O. Box 307, Round Lake, Ill. 60073; Leo J. Aubel, 111 Rivershire La., Lincolnshire, Ill. 60069

[21] Appl. No.: 395,066

[22] Filed: Feb. 27, 1995

[51] Int. Cl.$^6$ .............................. H04Q 7/20; H04Q 7/24
[52] U.S. Cl. .............................. 379/58; 379/59; 379/60; 455/33.1; 455/33.2; 455/11.1; 455/62
[58] Field of Search .................................. 379/58, 59, 60, 379/63; 455/33.1, 33.2, 11.1, 67.1, 62, 51.1

[56] References Cited

U.S. PATENT DOCUMENTS

| | | | |
|---|---|---|---|
| 5,152,002 | 9/1992 | Leslie et al. | 455/11.1 |
| 5,408,679 | 4/1995 | Masuda | 455/11.1 |

*Primary Examiner*—Dwayne Bost
*Assistant Examiner*—Nay Maung
*Attorney, Agent, or Firm*—Leo J. Aubel

[57] ABSTRACT

A system and method for providing radio routing and radio frequency channel assignment in a radio telephone system utilizing signal strength and routing messages as a primary criteria for obtaining interference free call connections and communications.

10 Claims, 22 Drawing Sheets

The "E" stands for a land phone phone exchange of which three are shown: Northbrook, Waukegan, and Round Lake.

A user located in Deerfield desires to phone Round Lake.

Only some of the cell sites are shown.

The "E" stands for a land phone phone exchange of which five are shown: Northbrook, Waukegan, Round Lake, Antioch and Libertyville A user located in Deerfield desires to phone Round Lake Only some of the nodes are shown

SYSTEM AND METHOD OF CALL ROUTING AND CONNECTION IN A MOBILE (REMOTE) RADIO TELEPHONE SYSTEM

The concepts of cellular radio are well known, and in fact all major metropolitan areas in the USA today enjoy cellular radio service. However, there are still vast areas in the USA, and also vast areas in the world that do not yet enjoy cellular radio or any form of radio telephone. The reason for this lack of service lays in the cost factors associated with conventional cellular technology. One of the most expensive elements in a cellular system is the central cellular switch. The central cellular switch controls channel choice, handoffs, and connection into the various land line carriers. The centralized concepts associated with cellular radio tend to be very expensive, and not very flexible. Also a system using a central cellular switch requires numerous land line connections from the remote radio base sites (cell sites) to the central cellular switch. Land line connections are required for the desired communications links and also for the various control functions.

An approach for assigning channels in a decentralized system is covered in U.S. Pat. No. 4,965,850 which is incorporated herein by reference. The present invention is an improvement over U.S. Pat. No. 4,965,850.

The concept of having radios mounted on numerous telephone poles such that the radios connect into the existing land line network has been well publicized. For example, several articles have appeared in the IEEE by Donald Cox who was at Bellcore, the portion of Bell Labs that went to the regional Bells at the AT&T divestiture, at the time the articles were written. The concept of the telephone pole radio system implies decentralization. The underlying assumption was that the local land line telephone company would take on the responsibilities of the cellular switch. However, a problem of that concept was that the various exchange switches might not have the proper functionality, and additionally the various exchange switches might be owned by another company such that cooperative efforts would be difficult.

To implement the decentralized approach as described in the telephone pole concept in a common carrier broad service environment including vehicular service, the technology disclosed herein considers the following factors. These factors relate to both technology and the operating environment in which cellular operates and include:

1. Relationship to existing land line carrier
2. Call routing
3. Call hand-off

Firstly, the relationship of the wireless company to the long distance carriers must be considered. If, for example, in a current cellular system, a wireless user in Northbrook, Ill. desires to contact a land line customer in New York, the wireless user in Northbrook will be using at least four different companies to complete the call. One for the airtime in the wireless network, another for the local phone company in Illinois that provides control and communication links from the cellular switch to the Northbrook cell site, a third for the long distance carrier, and fourth is the land line company in New York. Naturally, if it would be possible to easily eliminate the local telephone company from the economic picture, the charges to the final customer will be less.

The second factor considered relates to the call routing. Previously, there was no easy way for a call to be routed to a central switch without extensive land line charges from the telephone pole unit back to the central switch. Presently, the cellular operator takes responsibility for call routing from its various base sites to his switch. Typically, the local cellular operator rents dedicated land lines from the local phone company. In some instances the local cellular operator installs its own microwave links instead of renting various land lines. When microwave links are installed, they replace the dedicated phone lines. When the call is finally connected to the central cellular switch, the cellular operator can connect the call from its cellular switch directly to a local phone company switch.

In an example of current technology, a wireless user in Zion, Ill. located near the Wisconsin border who desires to contact another land line user in Zion, Ill. will be using the Chicago system that has a cellular switch located west of Chicago. The call must be routed from the wireless cell site in Zion to the Cellular Switch near Chicago, and then back into the land line network through several exchanges (switches) to finally get back north up to Zion. Since Zion is located about 50 miles from the cellular switch, this local call becomes a long distance call.

The third factors relates to handoff control. If a vehicular user in Northbrook moves to a location served by an adjacent cell site, the central cellular switches in operation today would know how to handle the handoff. In a decentralized system, there is a need to be able to control handoff without either a central switch, or a hierarchical system that might delegate handoff control to a local switch.

Consequently, there is a need for a system that would provide decentralized operation, without a large cellular central computer to control the various base sites, and yet such that this system could ultimately connect to the various land line services.

S. Arunkumar and R. S. Panwar in an article entitled "Efficient Broadcast Using Selective Flooding" on page 2060 in the IEEE INFOCOM discuss methods of improving the efficiency of the signaling process in the route establishment procedure. In their article they are referring to a US Army mobile subscriber system wherein nodes and links are in a freeform non-grid pattern. System nodes, transmitter and receiver sites, are connected to other nodes via point to point radio links. As nodes are moved around, different selective point to point links are established.

Although radio links between selected sites can be established by referring to standard topographical maps, propagation charts, and antenna compass directions, such procedures are expensive and not flexible. Also, there is the possibility for human error in propagation calculations, or map reading. At installation time, various antennas have to be pointed in specific directions. Also, if new sites are created or removed, then the entire system must be studied to ascertain the impact of the changes. If buildings have been built that are not on the maps, then selected radio paths will not work as planned. Consequently, there is need for a system that automatically establishes links based on the real propagation path, as opposed to establishing links based on some maps and calculations.

Preassigned channels for each given link requires careful adjustment and careful installation. In fact, when a given radio site is moved, there is seemingly no easy way to know which channels are being utilized in other places in the system that might have propagation links with other unintended sites. Without this prior knowledge, there is no easy way to guarantee a clear channel at any site. Accordingly, there is considerable value in having the channels automatically established without the possibility of interference between links.

A major practical problem in a mobile (remote) radio telephone system is to insure sufficient bandwidth to handle all of the conversations. With preplanned antennas and channel assignment, there is no flexibility to change around spectrum resources in response to system load. In contrast, in the inventive system described herein, links are automatically established based on signal strength; channels in the route are assigned dynamically based on dynamic signal to interference measurements thereby significantly increasing the call handling capacity of the system.

It is the purpose of this invention to offer a new technical approach for a mobile (remote) radio telephone system based on using radio links to connect various sites into the land line network. This approach will have several advantages over the conventional cellular equipment. Further, as the customer base builds, it will be easy to convert some of the telephone pole sites to conventional "cell" sites with a corresponding reduction in the amount of radio spectrum required to provide service. This invention will provide the possibility for new entrants into the cellular operations to cover wide geographic areas with a very efficient system.

SUMMARY OF THE INVENTION

The invention herein describes a system and method of wireless call routing and channel assignment between various cell site locations such that the optimum route back to one of several telephone exchanges is chosen in an interference free manner. The invention further assigns radio communication channels dynamically whereby the available radio spectrum is shifted around.

The foregoing features and advantages of the present invention will be apparent from the following more particular description of the invention. The accompanying drawings, listed hereinbelow, are useful in explaining the invention.

DESCRIPTION OF THE INVENTION

Figure 1:
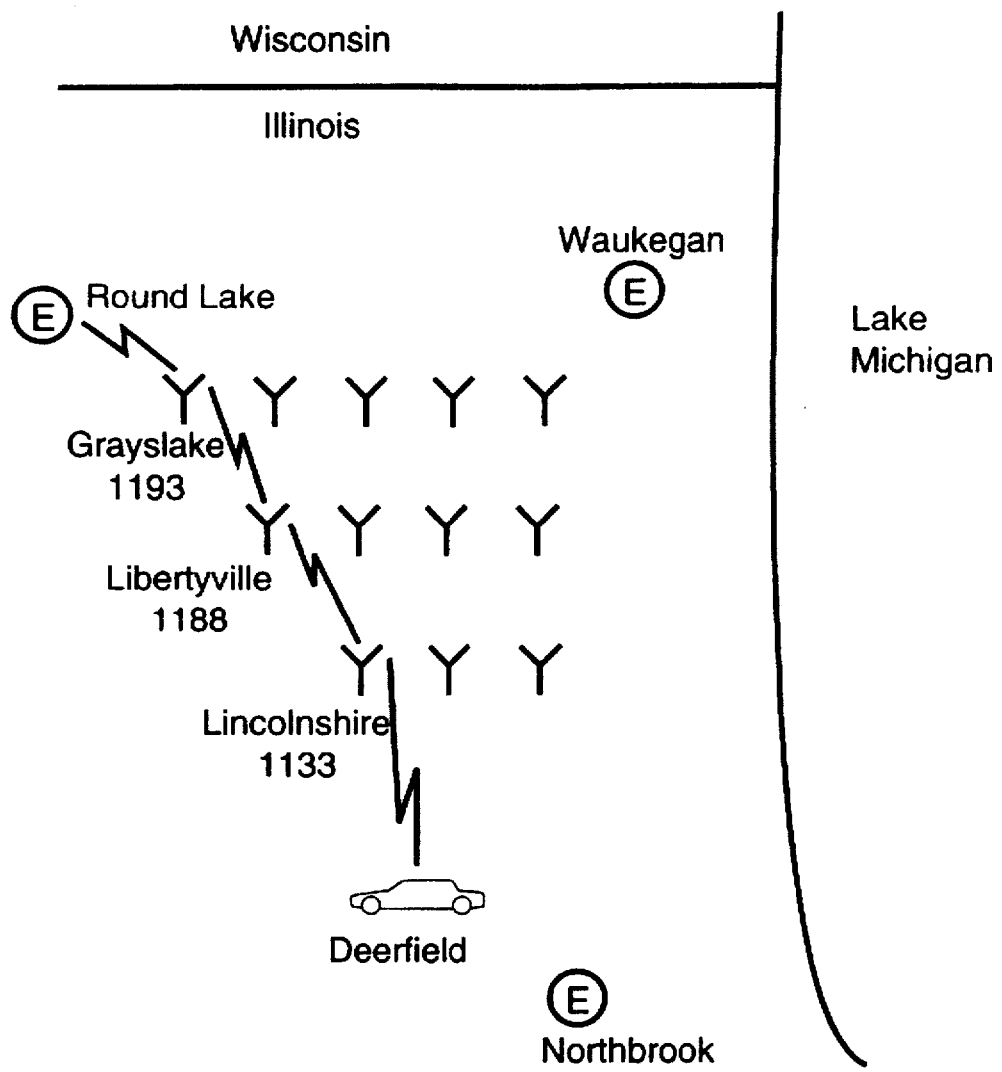
FIG. 1 is a drawing of a hypothetical suburban area showing a limited number of nodes and a limited number of drop points near exchanges.

The present invention discloses a decentralized call routing system and method for a node to node radio telephone communications system. In the present invention, each individual node makes decisions for subsequent links based on information and signal strength derived from the received signaling signal.

It is the purpose of this invention to provide a radio service from the various cell sites to various desired drop points. These desired drop points are located near associated exchanges. The present system is totally self organizing. Previously, when radio links are used instead of land line phone lines to link cell sites to various destinations, careful system planning and design is required to insure that each link has its private interference free channel, and that specific locations can communicate directly to other specific locations. It is the purpose of this invention to provide a system and method so that cell sites can be placed anywhere, without a specific cell pattern, and that the routing and channel assignment to the desired exchange locations though intermediate cell sites will occur automatically.

Definitions, language usage, and basic system concepts.

Cellular radio uses the term "cellular switch" to refer to the central controller that assigns channels, controls handoff, and connects into the land line network. The term "telephone switch" refers to switches that are used to connect various incoming land lines to various outgoing land lines. In the cellular radio concept, the central controller (cellular switch) is used to connect the land lines coming back from the cell sites to the land line telephone network.

Centralized systems are systems such as cellular radio that are controlled by a central controller. Decentralized systems such as citizen band radio are not controlled by a central controller.

There are three different types of functional units described herein that contain radio equipment.

"Nodes" are radio units that contain the following components:

A) Radio transmitters and radio receivers to communicate with various remotes similar to todays cell sites.

B) Radio transmitters and radio receivers to communicate with other nodes perhaps similar in concept to repeaters.

C) Internal switching means to connect various receivers to various transmitters.

E) Internal computer means to perform functions and calculations typically associated with on line computers.

F) Scanning receivers are also included herein. These receivers are controlled by the associated computer to move or monitor specific channels.

G) Antennas

"Drops" are transmitting and receiving sites that connect to the land line phone network. These drops are related to the stationary half of a consumer cordless phone. Drops are normally associated with a phone exchange, and referred to also as "exchange drops".

"Remotes" are radio units that are free to move about and transmit and receive information. These remotes are related to mobiles, portables, cordless computer keyboards, and the movable half of a consumer cordless phone.

Each node, drop, and remote has a unique identifier or code that identifies that particular unit.

Certain new technologies are available that would combine several of the functions of the above components into a single operative unit. However, for purposes of description of the functionality of the system herein, the concepts are treated as separate hardware units.

For example, in an article in the November 1994 issue of Cellular Business by Elliott Drucker, entitled "The Advantages of Broadband LPAs, the concepts of a linear power amplifier are presented. Drucker describes that tunable cavities and the various power amplifiers previously present at a cell site can be combined into a single hybrid combiner and a single linear power amplifier. In addition, Steinbrecker corporation, a Massachusetts supplier of radio equipment to the cellular industry, has combined many of the modulation and demodulation functions of separate radios into a single computer like device. The combination of the two aforementioned technologies can give rise to cell sites that are quite small, and the concept of fitting all of the equipment into a single "potato chip" can as described by Cox is available in today's hardware technology.

DETAILS OF INVENTION

Figure 2:
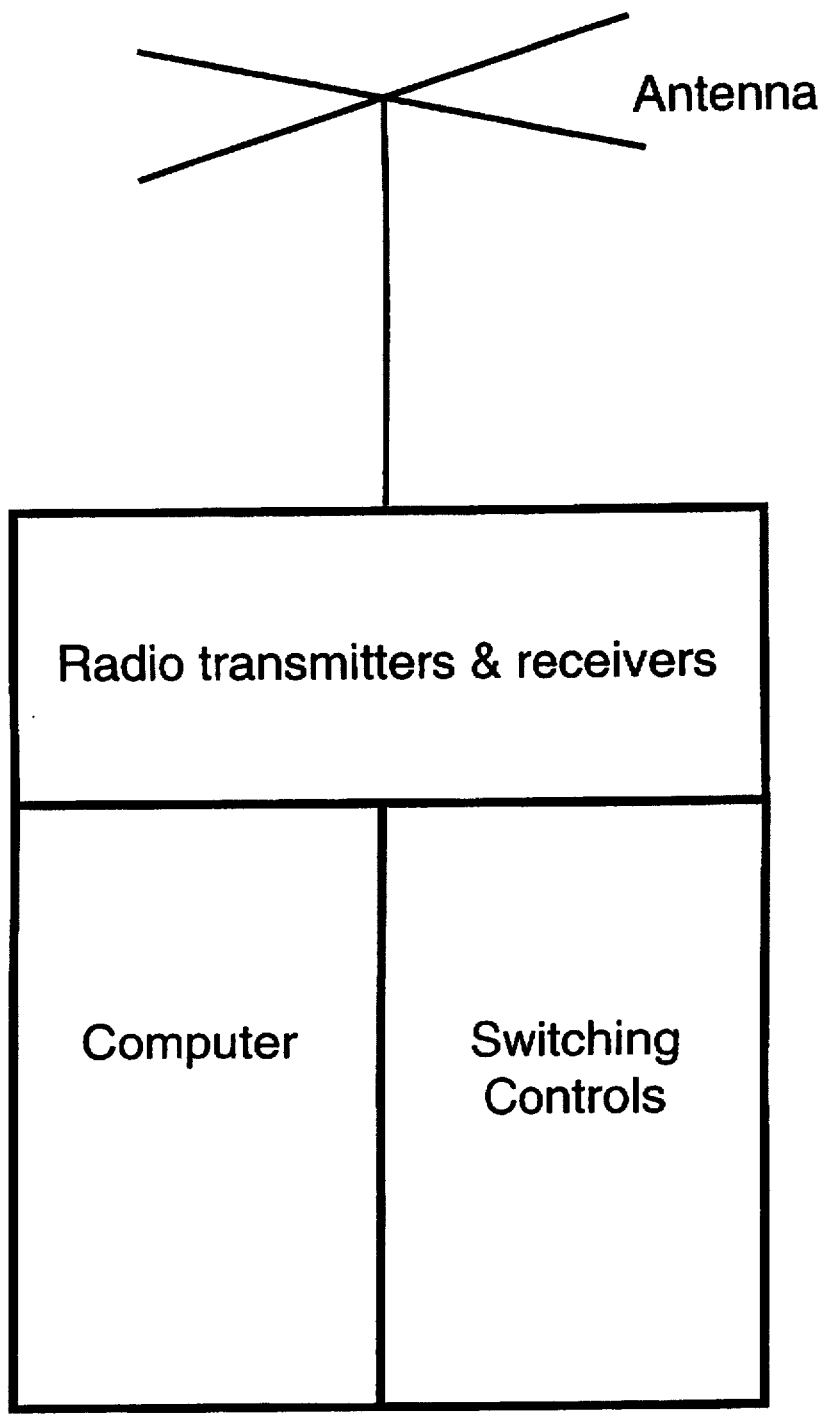
FIG. 2 is a drawing showing the computer means, switching means, and radio means present at a typical node.

Refer to FIG. 2. The nodes receive and transmit radio signals in response to computer information and received signals. These radio signals can be directed to, or received from, various remote users in the system, or to other nodes or drops that are within radio reach. The drops are positioned such that there is a maximum of one drop per land line phone exchange, and each drop or node can handle many simultaneous conversations. The maximum number of calls handled by a node or drop is only limited by the radio spectrum available for the system. As depicted in FIG. 1, the total path to complete the call is herein referred to as the route, and the individual segments of that path are referred to as links. Importantly, the nodes defined above are divided into two categories, and for simplicity the nodes are designated as odd and even numbered nodes.

In addition to the radio units that support the remote to node communication, there is a separate and distinct radio/computer system that will route and connect the calls to various land line locations. This routing system is decentralized; there is no central control, and each unit operates autonomously.

The present invention combines the concept of routing with the concept of interference free channel assignment. This system further relates the foregoing concepts with dynamic decentralized signal to interference as explained in U.S. Pat. No. 4,965,850 and U.S. patent application Ser. No. 08/276,781 filed Jul. 18, 1994 entitled "Decentralized Radio Communications System and Method for Assigning Channels with a Minimum of Signaling between Remotes and Bases" such that preplanning of cell locations to other cell locations is not required. Preplanning of the various links back to various drop points is not required. In fact, as various high traffic cells, ie sites, are changed to permit land line connections back to the central switch, all of the hardware previously at that site can be moved intact to other locations, and the system will automatically adjust to its new location.

A central switch or central controller is not required in the present invention. This feature of no central computer or central controller is a basic feature of the invention. Preplanning, frequency selection, site to site propagation analyses are not required. The system automatically adapts to the entrance of the new node, and call routings and channel assignments for the call routings are handled automatically. A technician merely has to climb the telephone pole, unscrew the unit from the telephone pole, and unplug the power source, and take the unit to a new location, and mount it to the telephone pole and plug it into the available power source. Additionally, this invention might be utilized in an existing installed centralized system.

As will be explained, the various nodes transmit information on various links, the nodes utilize this information, and retransmit information. The repetition of this process builds information in all of the nodes showing the optimum route from each node to each drop point. Also importantly, this call routing information is created in advance of any call set up or call connection process.

In the present invention for node to node communications omni directional antennas are used. The omni as used herein refers to the north south and east west directions, and not the up and down direction. The omni directional antennas are designed by well known procedures to transmit their lobes in a slightly less than the horizontal direction. Since all of the nodes are at about the same elevation above ground, a narrow beam can be utilized to provide significant signal gain.

Refer to FIG. 1 which shows a number of nodes in an example area in the United States. Although other exchanges and other nodes would normally be present in the same area, only a few of the nodes and exchanges are shown for simplicity in explanation. FIG. 1 shows the connection of a remote user in Deerfield to an exchange located in Round Lake. In this particular example, the remote user in Deerfield wants to talk to a land line customer in Round Lake with a 546 telephone prefix. Although the Deerfield user is near the Northbrook exchange, it is desired to connect the user to the Round Lake exchange. This example will also be used subsequently to explain in detail the call set up and channel assignment procedure.

Two types of nodes, designated as odd and even nodes, are used. The even numbered nodes transmit and receive on different bands than the odd numbered nodes. If all the nodes were identical, they would all transmit in the same band, and receive in the same band; in this situation, node to node communication can not occur. For node to node communication, the bands must be reversed between the two units that are in communication. The spectrum for the node to node call routing and communication system is divided into several bands. The system designed herein is designed to operate at 1,900 megahertz. A band of frequencies of 13 megahertz is used as follows.

TABLE I

| Spectrum | Band Name | Function | Odds | Evens |
|---|---|---|---|---|
| 1 Megahertz | Sig | Signaling | T & R | T & R |
| 2 Megahertz | A | Node to Drop | T & M | T & M |
| 2 Megahertz | B | Node to Drop | R | R |
| 1 Megahertz | C | Node to Node | T & M | R |
| 1 Megahertz | D | Node to Node | R | T |
| 1 Megahertz | E | Node to Node | R | T & M |
| 1 Megahertz | F | Node to Node | T | R |
| 2 Megahertz | G | Remote to Node | R | R |
| 2 Megahertz | H | Remote to Node | T & M | T & M |
| 0 Megahertz | I | Paging System | | |

The bands above are a continuous spectrum of frequencies, and are subdivided above for engineering design purposes.

In the Table I, the T stands for transmitting and the R stands for receiving. M stands for the periodic messages that are transmitted, as will be explained hereinbelow. Bands A and B are paired with each other, bands C and D are paired with each other, bands E and F are paired with each other, and bands G and H are paired with each other. There term "paired" also means that channels are assigned in predetermined pairs from each of the bands.

In Table I, the Sig Band is a signaling band that is used for the route establishment process that will be explained herein. The Node to Drop bands A and B are used for communication to drops that function as control points as will be explained herein. The bands A and B operate in a similar manner as the bands for communication with the remotes. Bands C,D,E, and F are used for communication links between nodes. Bands G and H are utilized to communicate between the remotes and the nodes.

Bands A and B are used to communicate from both odd and even nodes to the drops. The need for two bands to connect the nodes to either a remote or a drop arises from the fact that it simplifies the signaling process that occurs in performing the four tests as will be explained herein below. In bands G and H the remote originates the signaling process, and in bands A and B, the nodes originate the signaling process.

Band I is used for city wide paging. This band functions differently than band H, but is located in the top channel of band H. The design of paging systems is well known. Consequently, this band does not utilize any additional spectrum, and is indicated above as zero megahertz.

Each of bands C,D,E, and F are one megahertz wide with channels spaced 30 kilohertz apart. Each channel, after space for guard bands, is designed to carry the normal 3 kilohertz voice. There are 30 channels in each of the above bands.

The exchange drops transmit on band B and listen on Band A for node to exchange communications. Also, the final link in any conversation will be to the land line drops.

Each node can communicate with approximately half of the total nodes in the system; consequently, if the nodes were laid out in a random manner, it would only be possible for a given node to talk to half of the other nodes. However, in a normal cellular/PCS system the number of possible routes is so high that the loss of communication to 50% of the nodes at alternate links will not statistically cause a problem.

The procedure of routing a call from a distant node back to a local exchange comprises essentially two tasks. The first task is to establish a route through various nodes that will ultimately connect back to the desired point. The second task is to assign channels along that route, so that interference does not occur.

Call Routing

The first task in connecting a call to a desired drop point is to establish the route. In a cellular system, the location of the nodes will be relatively permanent, and once a given node knows the route back to a particular drop point or particular exchange, this route should not change unless a change occurs in the node layout.

Although the system might have a central switch similar to today's central switch, the majority of calls are handled through local drop units. These local drop units are similar to the central switch in that they record call billing information, and route the call along. However, since they will handle only a limited number of calls, there are much simpler in design and construction.

In the signaling band, all nodes can both transmit and receive. The signaling band is divided into a series of time slots. There are 5,000 time slots in the signaling band. The first 1,000 slots are reserved for land exchange drops. The remaining 4,000 slots are reserved for cell sites or nodes.

Each desired drop is given a sequential number between L1 and L999. These sequential numbers also correspond to the time slot number. Consequently, the maximum number of drops in the system is 999. In most installations, the number of drops will be less than 50.

Each node is given a sequential number between 1001 and 5000. The nodes that transmit in Band C are designated by odd numbers, and the nodes that transmit in Band D are designated by even numbers. Each sequential number corresponds to a time slot number. Consequently, the maximum number of nodes that this system will support is 4,000. (The number could be increased by minor expansion in the signaling time slots that will be explained hereinbelow.) In most installations, the number of nodes will be less than 250, however, for purposes of explanation we have used examples with larger capacities.

A master cycle comprises all of the time slots. Since in this embodiment there are 5,000 time slots, the master cycle takes 5,000 seconds. 5,000 second corresponds to somewhat over an hour. There is only one channel in the signaling band. The channel is one megahertz wide.

The following table depicts a typical usage of the various time slots arbitrarily given names of separate towns in Table II.

TABLE II

| Time Slot No. | User of Slot |
| --- | --- |
| 1 | L001 (Located in Round Lake) |
| 2 | L002 (Schaumburg) |
| 3 | L003 (Evanston) |
| 4 | L004 (Glenview) |
| 5 | L005 (Lisle) |
| 6 | L006 (Libertyville) |
| . | . |
| . | . |
| . | . |
| 27 | L027 (Antioch) |
| . | . |
| . | . |
| . | . |
| 1001 | 1001 (Peoria node) |
| . | . |
| . | . |
| . | . |
| 1133 | 1133 (Lincolnshire node) |
| 1188 | 1188 (Libertyville node) |

The system provides periodic signaling once every four hours. The periodic signaling need not be timed for four hours, but may be any desired time longer than the master cycle time. Each master cycle, as will be explained below, will permit an increase in the number of links in a route, and consequently to permit multilink routes, the master cycle must be repeated. Signaling occurs to establish the routes from all nodes to all of the concerned potential drops. This sequence of several master cycles need only occur once, but occasionally nodes might fail or lose power, so periodic checking insures better system operation. Each node signals in the time slot corresponding to its number. For example, node 1143 would transmit during time 1143 during the signaling cycle.

Figure 3:
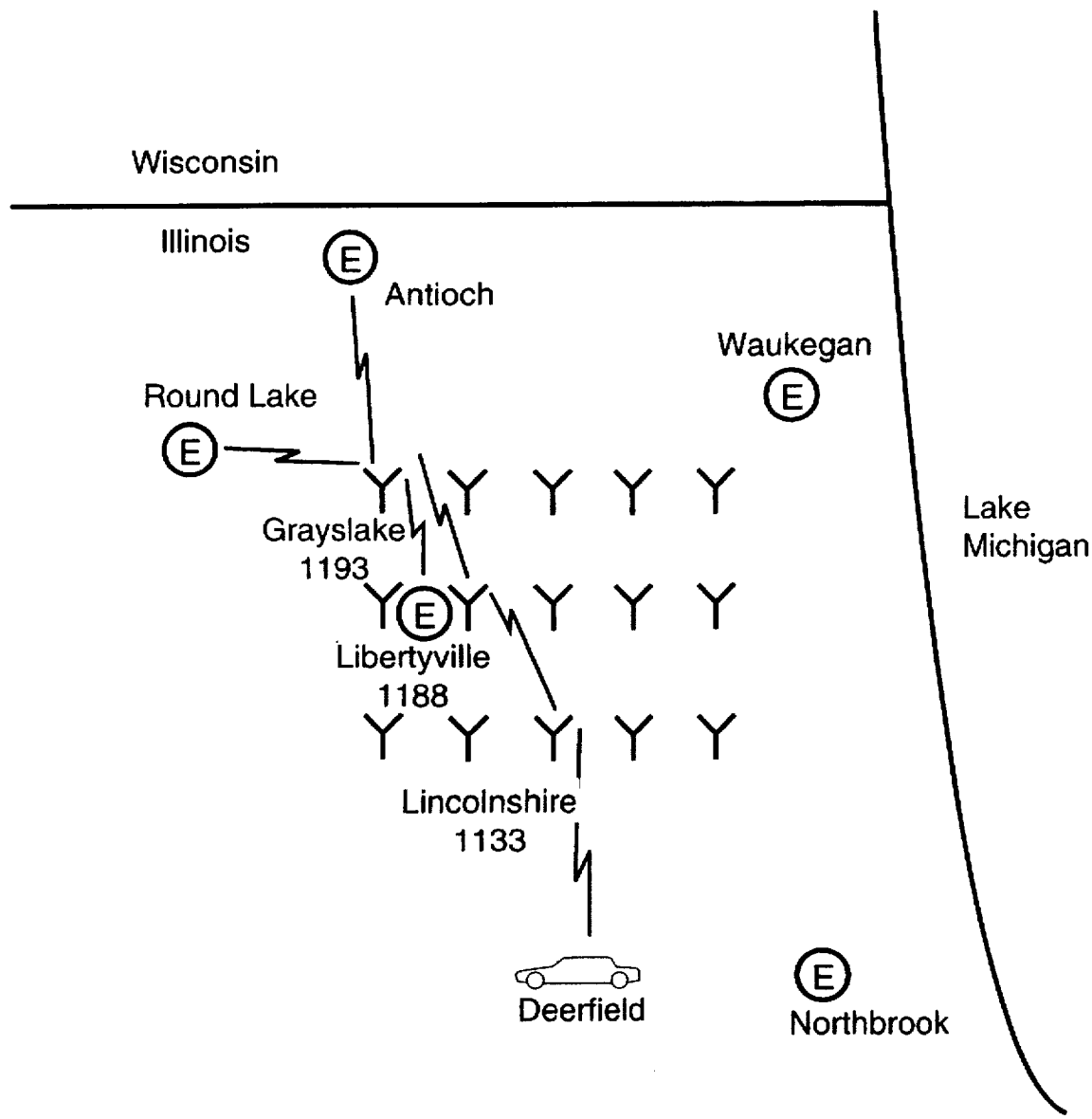
FIG. 3 is a drawing showing the network of FIG. 1, but adding additional exchange drops for purposes of explanation.

In the particular example shown in FIG. 1 and FIG. 3, the following is a list of some of the concerned exchanges and their typical prefixes. All of the exchanges are in area code 708.

TABLE III

| Exchange Location | Area Code-Prefix-Number |
|---|---|
| Round Lake | 708-546-XXXX |
| Round Lake | 708-740-XXXX |
| Northbrook | 708-480-XXXX |
| Libertyville | 708-362-XXXX |
| Antioch | 708-395-XXXX |

Step One of Call Routing

The first step is for the various drops to transmit a routing message in their unique time slot. The signaling channel is one megacycle wide to permit high speed data transmission. The routing messages are sent as sequential data streams through modems, as is well known. Each routing message contains the following:

TABLE IV

| Information | Example |
|---|---|
| Time Slot Number | L001 |
| Exchange Number | L001 |
| Prefix | 546 |
| Link Number "1" | 1 |
| Signal Strength | 999 |
| Exchange Number | L001 |
| Prefix | 740 |
| Link Number "1" | 1 |
| Signal Strength | 999 |

The above example pertains to the transmission that would come from Round Lake. Since Round Lake has two different prefixes, two different sets of information are transmitted. The link number transmitted is "1" as this will be the first link in the final routing. The signal strength, as will be explained hereinbelow corresponds to the number of Dbs over threshold. Since there is no received radio signal at this point, the number 999 is transmitted.

Step Two of Call Routing

Although the number will vary, approximately twelve different nodes might receive this transmission from Round Lake. Since node antennas are higher than remote antennas, it is usually the case that node to node communications occur over greater distances than remote to node communications. A threshold level is set at each node receiver and signals received less than 30 Db over threshold are excluded. Such signals are considered too weak to provide satisfactory service in a potential multiple link environment.

Refer to FIG. 3. For example, node number 1193 (Grayslake) might hear and record the following messages received from various drops. The signal strengths and corresponding node and drop information, exchanges, prefixes, and link numbers are loaded into a computer memory table in the node as follows:

TABLE V

| 1193 (Grayslake) | | | |
|---|---|---|---|
| Exchange | Prefix | Link | Signal Strength |
| L001 | 546 | 1 | 99 |
| L001 | 740 | 1 | 99 |
| L006 | 362 | 1 | 99 |
| L027 | 395 | 1 | 99 |

The current measured signal strength is also added to the table. The table is now as follows:

TABLE VI

| 1193 (Grayslake) | | | | |
|---|---|---|---|---|
| Exchange | Prefix | Link | Sig Str | New Signal Strength |
| L001 | 546 | 1 | 99 | 32 |
| L001 | 740 | 1 | 99 | 32 |
| L006 | 362 | 1 | 99 | 43 |
| L027 | 395 | 1 | 99 | 44 |

Note that in the above table only those drops having signal strength over 30 Db are added to the table. In the above limited example, node 1193 (Grayslake) heard only three different transmissions from drops. These three different transmissions contained a total of four different prefix numbers. As each transmission is received the signal strength is measured, and the signal strength is recorded in the table above.

Step Three of Call Routing

The next step in the procedure occurs in the next master cycle. Both nodes and drops transmit again. Each node transmits in its unique time slot all of the prefixes that it has heard. The nodes add their own number and transmit all of the information in the above table. For example, node 1193 (Grayslake) would transmit the following during its unique time slot. Since each node is adding a link to all tentative routes, the link number for each route is increased by one. Only a portion of the transmission is shown in table VII.

TABLE VII

| 1193 | Land node number |
|---|---|
| L001 | Exchange number |
| 546 | Prefix |
| 2 | Link number |
| 32 | Received signal strength |
| L001 | Exchange number |
| 740 | Prefix |
| 2 | Link number |
| 32 | Received signal strength |
| L006 | Exchange number |
| 362 | Prefix |
| 2 | Link number |
| 43 | Received signal strength |
| L027 | Exchange number |
| 395 | Prefix |
| 2 | Link number |
| 44 | Received signal strength |

Step Four of Call Routing

Refer to FIG. 3. Various additional nodes hear the transmission from node 1193. These additional nodes also hear transmissions from other nodes in the different time slots. Each node then makes a table of all the transmissions that it has received. Transmissions below 30 Db are excluded. A portion of this table might appear as follows for node 1188.

TABLE VIII

| Table for Node No. 1188 (Libertyville) | | | |
|---|---|---|---|
| Node | Prefix | Signal Strength | Link |
| 1133 | 362 | 43 | 1 |
| 1193 | 546 | 32 | 2 |
| 1193 | 740 | 32 | 2 |
| 1193 | 362 | 43 | 1 |
| 1194 | 546 | 50 | 2 |

TABLE VIII-continued

Table for Node No. 1188 (Libertyville)

| Node | Prefix | Signal Strength | Link |
|------|--------|-----------------|------|
| 1194 | 740 | 50 | 2 |
| 1195 | 546 | 31 | 2 |
| 1195 | 740 | 31 | 2 | above example, node 1188 heard messages from six different nodes and drops. However, most were deleted as they were below the 30 Db threshold. Node 1188 also received useless message back containing itself as a node in the route. In the previous cycle it had transmitted that it related to exchange 362, and two nodes 1193 and 1133 have transmitted that information back.

The left hand column above indicates the node from which the transmission was received. The second column indicates the prefix that was with the transmission. The third column indicates the signal strength that was in the message. The fourth column indicates the number of links involved.

At this point the new signal strength being received is added to the table as follows:

TABLE IX

Table for Node No. 1188 (Libertyville)

| Node | Prefix | Sig. Str. | New Sig Str. | Link |
|------|--------|-----------|--------------|------|
| 1133 | 362 | 43 | 43 | 1 |
| 1134 | 480 | 30 | 38 | 2 |
| 1193 | 546 | 32 | 43 | 2 |
| 1193 | 740 | 32 | 43 | 2 |
| 1193 | 362 | 43 | 43 | 1 |
| 1194 | 546 | 50 | 55 | 2 |
| 1194 | 740 | 50 | 55 | 2 |
| 1195 | 546 | 31 | 37 | 2 |
| 1195 | 740 | 31 | 37 | 2 |

At this point the node deletes from the table every message that it has received from an even number node. Since 1188 is an even numbered node, it can not communicate with other even numbered nodes. If this node would have been an odd numbered node it would have deleted the odd numbers. Since half of the nodes are even and half are odd, this deletion cuts the table in approximately half. Two of the nodes that 1188 received from were even and they are deleted from the table. The reason for this deletion will become apparent later as explained below.

The next step is to sort the table into prefix sequence, and consequently, all of the messages with a selected prefix will be grouped together. For example, a portion of the above table would be as follows:

TABLE X

Table for Site No. 1188 (Libertyville)

| Site | Prefix | Sig. Str. | New Sig Str. | Link |
|------|--------|-----------|--------------|------|
| 1193 | 546 | 32 | 43 | 2 |
| 1195 | 546 | 31 | 37 | 2 |

The next step is to select only the best link for each prefix. If two different routings contain a different number of links, the routing with the minimum number of links is chosen and the routing with the higher number of links is dropped from the table. Since only acceptable signal strengths above the preselected 30 Db threshold are entered in the table, this process selects a route with a minimum number of links. This procedure will reduce the number of transmitters that are radiating power and consuming spectrum capacity in the usage of the routes.

The next step is to drop all sub-optimal links. The links with inferior signal strength are dropped from the table. In the above table, the following is the worst link in each route:

TABLE XI

| 1193 | 32 |
| 1195 | 31 |

In the above example, if 1188 (Libertyville) wanted to contact prefix 546, 1188 would have two choices. However, the route through 1193 (Grayslake) provides the best signal strength, and consequently that route is chosen. The routes including 1195 are dropped from the table. The known Bellman principle of optimality indicates that an optimum routing contains optimum sub routings. If two routings contained identical numbers for both signal strength and links, the one with the lower position in the table is chosen.

One key point in the procedure above is that each node has the capability, through storage in its computer memory, to provide at least one route to all prefixes that can be reached with a signal greater than the minimum threshold as described above.

Step Five of the Routing

During the next master cycle, another transmission occurs as follows. At this point, the computer in node 1188 (Libertyville) increases the link number in its internal tables. The next step is for node 1188 to transmit the information in its computer memory table. As explained above, the node 1188 has already eliminated unsatisfactory links, and only transmits the best link for each possible exchange.

A portion of the transmission at this step is as follows:

TABLE XII

| 1188 | Land node number |
| 546 | Prefix |
| 3 | Links |
| 32 | Signal Strength |

Note that node 1188 will also transmit the same messages about other exchanges that were received via the same and other nodes.

Step Six through "n" in the routing

Node 1133 receives the transmission from node 1188 and stores the information contained in the transmission in its memory. Node 1133 also receives transmissions from other nodes and other exchanges, which it also stores in its memory. Node 1133 then performs the same steps that were performed by node 1188 to determine the optimum link to an intermediate node back to origin of prefix 546. This causes node 1133 to delete from its memory all of the non optimum links, and thereby node 1133 determines that the optimum route back to exchange 546 is through node 1188.

At this point, if a remote or mobile user in Deerfield wants to use his telephone, node 1133 is in a position to route a call to Round Lake to the 546 prefix.

Call routing is now complete.

While node 1133 can not determine the total route, it can determine the best immediate link for each exchange. Node 1133 does not store the total route. During subsequent master cycles, the various nodes again transmit in their selected time slots the various remaining links. The procedure continues to cycle as in the above steps.

At this point, after the routing process has been completed, any given node in the system has a table of the optimum routing through other nodes to get to each individual prefix. For example in our above example, node 1188 would have stored essentially permanently the information that the best way to route to the drop point near the exchange containing 546 would be through node 1193.

Figure 4:
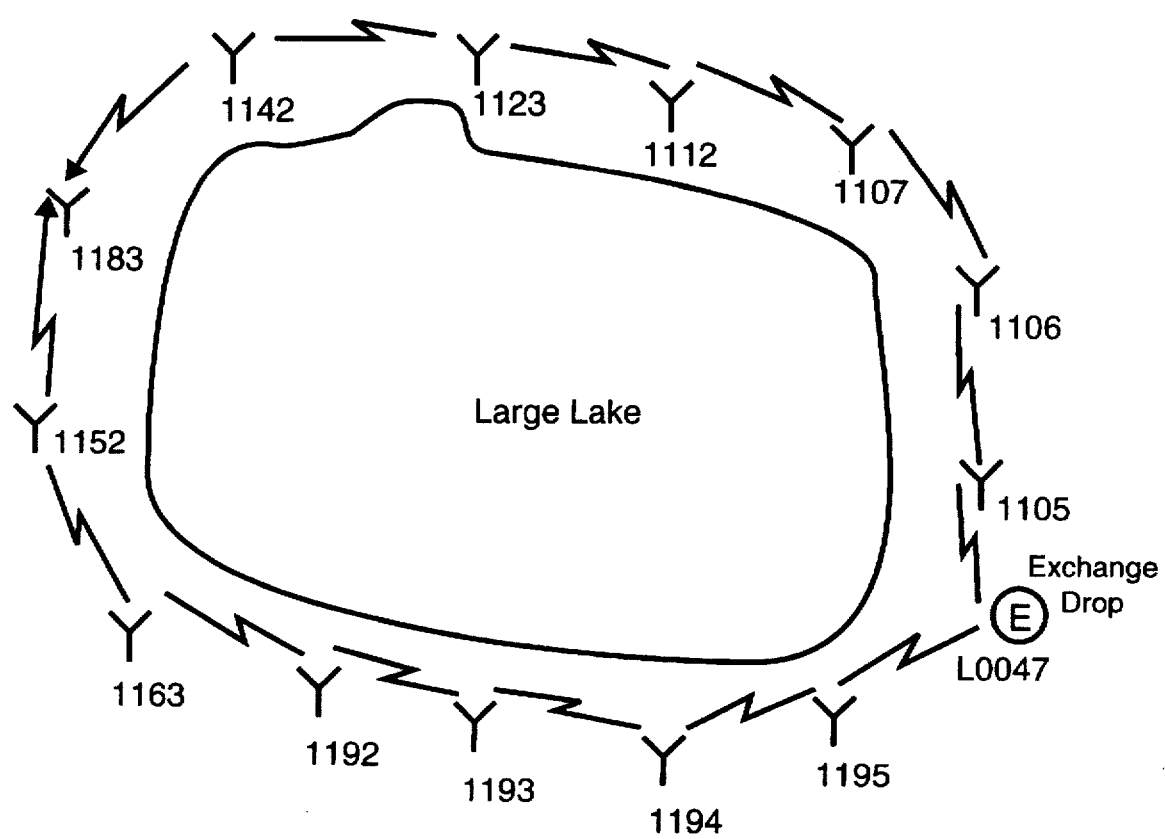
FIG. 4 is a drawing showing a series of sites surrounding a large lake.

Since each node only transmits the preferred routing to each prefix at an exchange drop, the number of transmissions that a single node will make is limited to the number of prefixes in the system. As an explanation of this self limiting process, refer to FIG. 4, which shows an exchange drop L0047 and a series of nodes surrounding a large lake. Only a few nodes are shown to create a simple example. The node 1183 is on the far side of the lake relative to L0047. Let us assume in this example, that the lake is too large to permit propagation across the center of the lake. 1183 would receive from two different directions information as to how to contact a prefix at the drop at near the exchange L0047. 1183 would save only the link to the node that was part of the optimum route based on signal strengths to the drop near the exchange L0047. When node 1183 would transmit the various routings back to the other nodes, they would note the increased number of links, and drop the transmissions from their tables. However, 1183 would still know the best link that is part of the optimum route back to L0047.

Since the computerized sorting of the list of various links and selecting the preferred link will take some time, the node computer puts the most recently received 5 messages into a buffer to permit the calculations to begin five messages earlier. After the transmission, the 5 messages are moved from the buffer into the associated table.

If a node fails, or has no power, it can not transmit in the allocated time slot, and it will be excluded from any and all routes. If a node detects that any of its transmitter or receiver banks are not working, it will exclude itself from the transmission in the allocated time slot. When a node excludes itself from participation in the call routing process, it will be excluded from the call set up process.

Under normal operation of the system, the routes will be very stable. However, if a new node is added to the system, or an existing node fails or is removed, the various routes and links will change. Reliability of the system may be enhanced by requiring all replacement links in the table of links in the node to be established twice in sequence before deleting an older entry and adding a replacement entry.

Channel Assignment

When a remote or mobile user in Deerfield desires to contact a land line user in Round Lake, the call routing has already been established. The Deerfield user now initiates a call.

It has been found that the process of using the various tests utilized in U.S. Pat. No. 4,965,850 above to assign channels creates excellent spectrum usage with minimal interference. In contrast to U.S. Pat. No. 4,965,850 in the prior art, the act of just monitoring at only one of the two potential radios units, does not detect all of the potential interference. Monitoring without comparison of desired and undesired signals usually implies setting of the threshold for channel reuse. If the threshold that will allow the channel to be reused, is set at a low number, a metropolitan area will have very little channel reuse because the channel with very weak or distant signals on them will always appear in use. If the threshold is set at a high number, the same area will have interference because users will start using an active channel without knowing it.

If two radio units are located in different places, they are each subject to a different set of potential signals that could interfere with them. They are also in a position to interfere with different sets of users. Also, frequently a channel is in use, but the new user pair have such a good signal between them, that they can successfully reuse the channel without receiving interference. Also, the other users might have a good signal between them, and the new usage will not interfere with them.

The present invention discloses an improved method of connecting the remote Deerfield user to a nearby node. This improved method is related to the method described in U.S. Pat. No. 4,965,850 hereby incorporated by reference. This improvement permits the reduction from tahe multiple tests described in U.S. Pat. No. 4,965,850 to a method utilizing two procedures as will now be described.

Importantly, it was found that the first modification necessary to utilize the present improvement is to increase the minimum signal quality for an acceptable communication from zero threshold to a significantly higher value, say 30 Db.

The next important modification is to introduce a monitoring test at each of the node and the remote radios. Refer to FIG. 1 where the remote in Deerfield is trying to establish a communication path to node 1133 in Lincolnshire. The tests set forth in U.S. Pat. No. 4,965,850 that must pass in order to insure interference free channel assignment are as follows:

Test 1 Will the transmission from the new node 1133 cause interference with any other previously assigned remote receiver?

Test 2 Will the Deerfield remote receive an interference free signal?

Test 3 Will node 1133 be interfered with by any other remote transmitter?

Test 4 Will the Deerfield remote transmission interfere with any previously assigned node?

Inventive Procedure 1

The various nodes are continuously scanning the channels looking for usable channels. The messages and the scanning are synchronized such that the messages are transmitted for each channel in synchronization with the scanning for each channel. As the Lincolnshire node scans and monitors a tentative channel, say channel R1, it measures the signal strength received on that channel. The Lincolnshire node passes procedure 1 if the measured signal strength is less than 10 Db over threshold. If the measured signal strength is greater than 10 Db over threshold, the Lincolnshire node attempts another channel.

Figure 6:
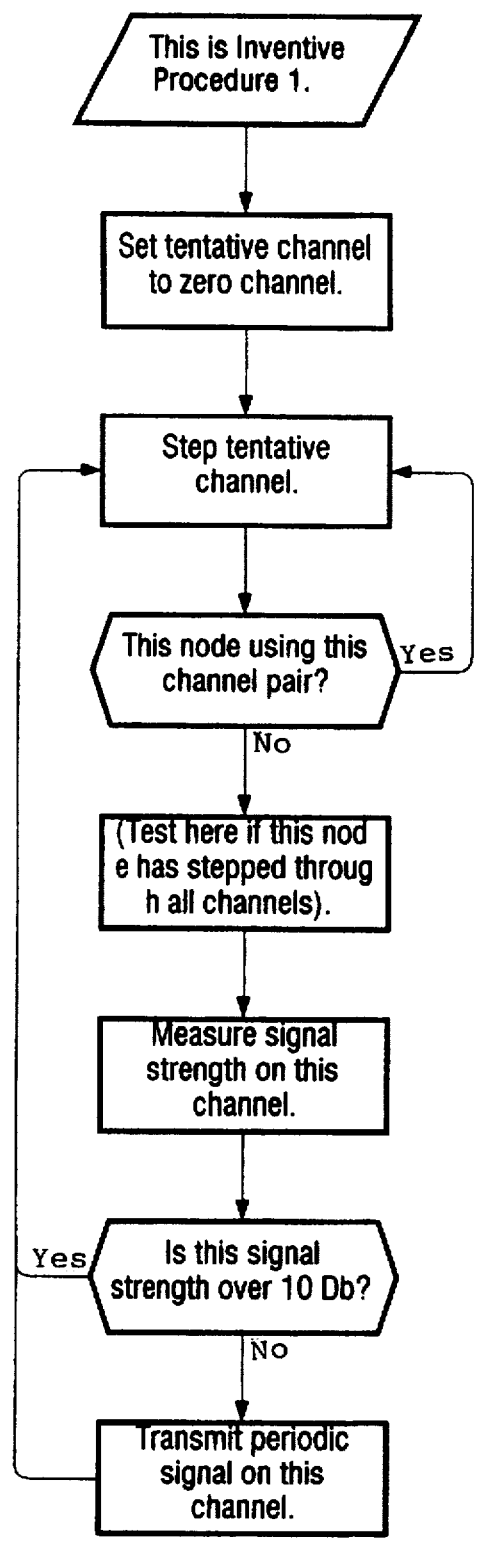
FIG. 6 is a flow chart showing the steps in procedure 1 for the node to remote link.

Refer to FIG. 6 for a flow chart of this procedure. The rational for this procedure is as follows. If the signal on the tentative channel is less than 10 Db over threshold it will not interfere with the receiver at the Lincolnshire node, as the Lincolnshire node knows a priori that any desired signal will be stronger than 30 Db over threshold. This automatically passes test 3.

If the undesired signal is less than 10 Db, the Lincolnshire node knows due to signal reciprocity that its transmission will arrive at the prior active users receiver at less than 10 Db. The Lincolnshire node knows a priori the other prior users are communicating at over 30 DB desired signal level per the minimum acceptable level, the Deerfield remote knows that it will not interfere with any other conversation, and this passes test 1.

Consequently, this procedure passes both test 1 and test 3. In both test 1 and test 3 the desired to undesired signal ratio will be better than 20 Db. This 20 Db is sufficient for FM radio signals to capture.

When the Lincolnshire node passes procedure 1, it begins to transmit periodic messages on the corresponding paired channel. These periodic messages contain the node number and codes that say this is a signaling message indicating an acceptable channel.

Figure 16:
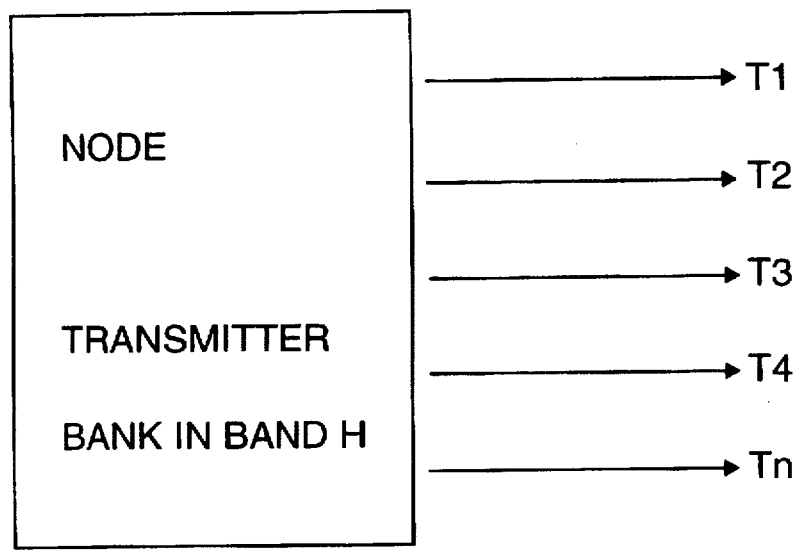
FIG. 16 is a diagram showing the transmitter and receiver channels of a node for communicating with a remote.
Figure 16:
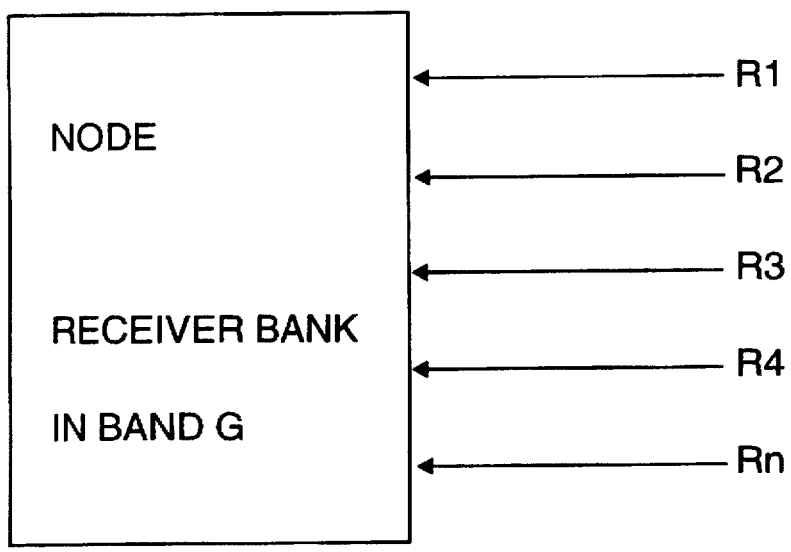

Refer to FIG. 16 which shows the transmitter bank transmitting on band H (see Table I), and the receiver bank receiving on band G. If, for example, the Lincolnshire node would have passed the procedure on channel R1, the Lincolnshire node would be transmit on corresponding channel T1. As mentioned above, the channels are paired.

Also, since a given remote might not hear this periodic message because of interference, the Lincolnshire node steps to the next channel(R2), and repeats this procedure 1; that is, the Lincolnshire node steps to the next channel and listens and measures the signal strength on that channel, and makes another decision. Consequently, if the Lincolnshire node passes the procedure 1 for channel R2, it will also transmit periodic messages on that corresponding channel (T2) simultaneously. The number of simultaneous transmissions of these messages on different channels by the Lincolnshire node is limited to five channels.

This process of stepping through the channels and turning on transmissions of messages will create several simultaneous transmissions on channels R1 . . . RN. When the node reaches the highest channel, the entire process is repeated, and new decisions are made for each channel. Thus the decisions for each channel are continuously refreshed.

In the meantime the Lincolnshire node is also monitoring the receiver channel R1 of the paired channel T1,R1 corresponding to each of its periodic messages. For example, if Lincolnshire is transmitting on T1, it would monitor R1 to determine if there is an acknowledge transmission from a remote desiring communication on the channel pair T1 and R1. It will know, as explained hereinbelow, that all four tests have passed. The Lincolnshire node will than use that channel pair for the communication.

Inventive Procedure 2

Figure 17:
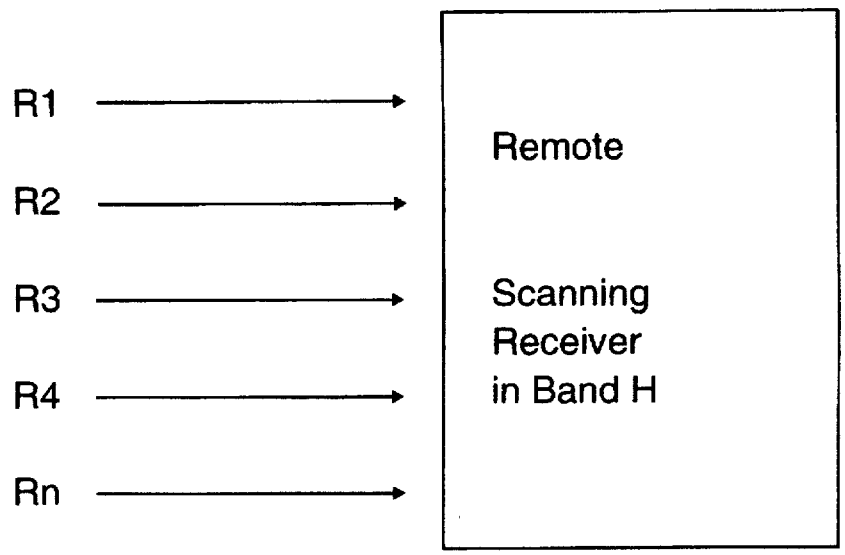
FIG. 17 is a diagram showing the transmitter and receiver channels of a remote.
Figure 17:
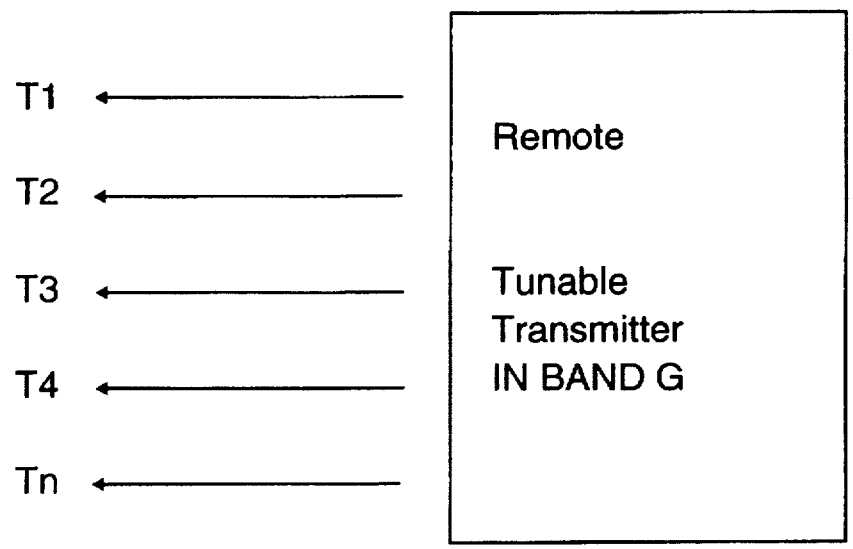

The Deerfield remote knows that it must establish a link to a node. The Deerfield remote must choose a node and the Deerfield remote must also choose a channel pair for communication to a node. Refer to FIG. 17. The Deerfield remote monitors a tentative channel, say channel R1 in band H, and measures the signal strength received on that channel. (Channel R1 for the remote is the same as channel T1 for the node.)

If the signal strength is below 30 Db above threshold, the Deerfield remote knows that an available node with an acceptable signal strength is not signaling on this channel. Consequently, the Deerfield remote monitors the next channel, say channel R2.

If the Deerfield remote hears a signal greater than 30 Db above threshold the remote analyzes this signal. The signal could be a periodic message from a node on an available channel, or the signal could be an unwanted communication using the channel. The Deerfield remote senses this signal and determines if it is part of an ongoing communication or if it is a message signal indicating a potential channel. If this is an ongoing conversation, the remote steps to the next channel. If this is a periodic message, then the remote knows it has a tentative node and a tentative channel pair. The Deerfield remote now listens in the time between the periodic message transmissions and measures the signal strength, if any, created by other users. If these undesired signals are less than 10 Db over threshold the remote accepts this channel and this node as an acceptable choice. If these undesired signals are greater than 10 Db over threshold the remote steps to the next channel.

Figure 7:
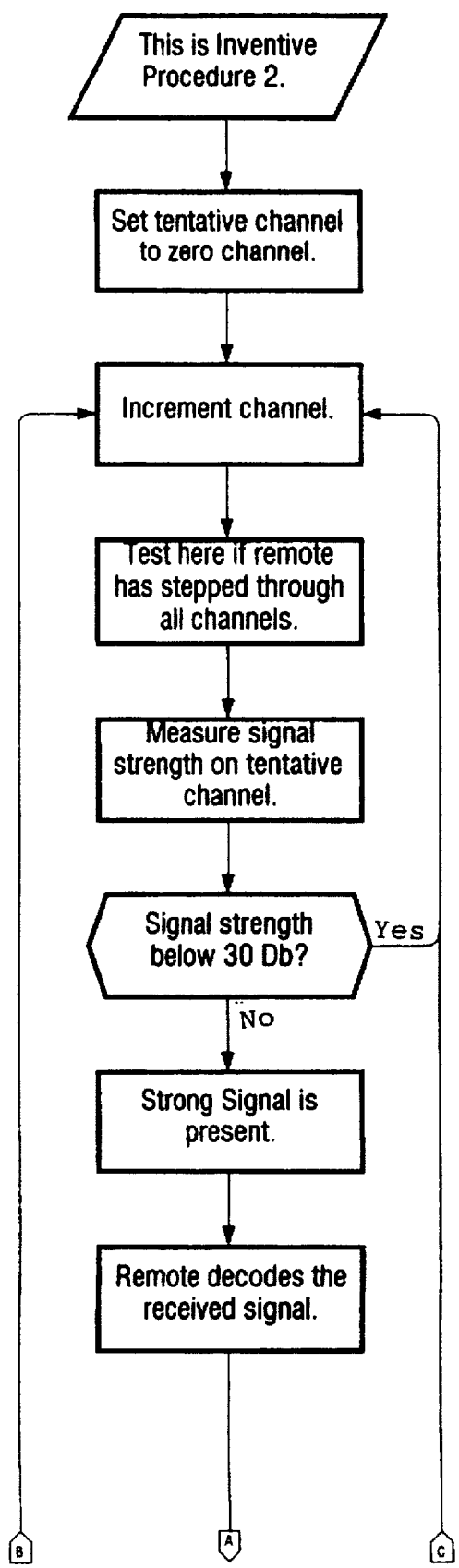
FIGS. 7 and 7A is a flow chart showing the steps in procedure 2 for the node to remote link.
Figure 7A:
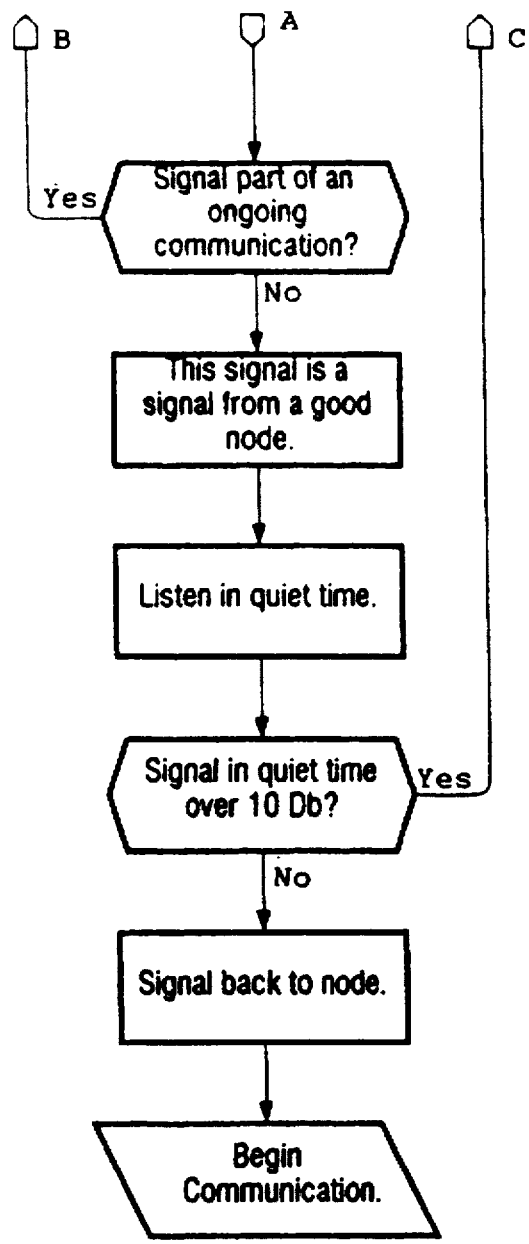
Figure 8:
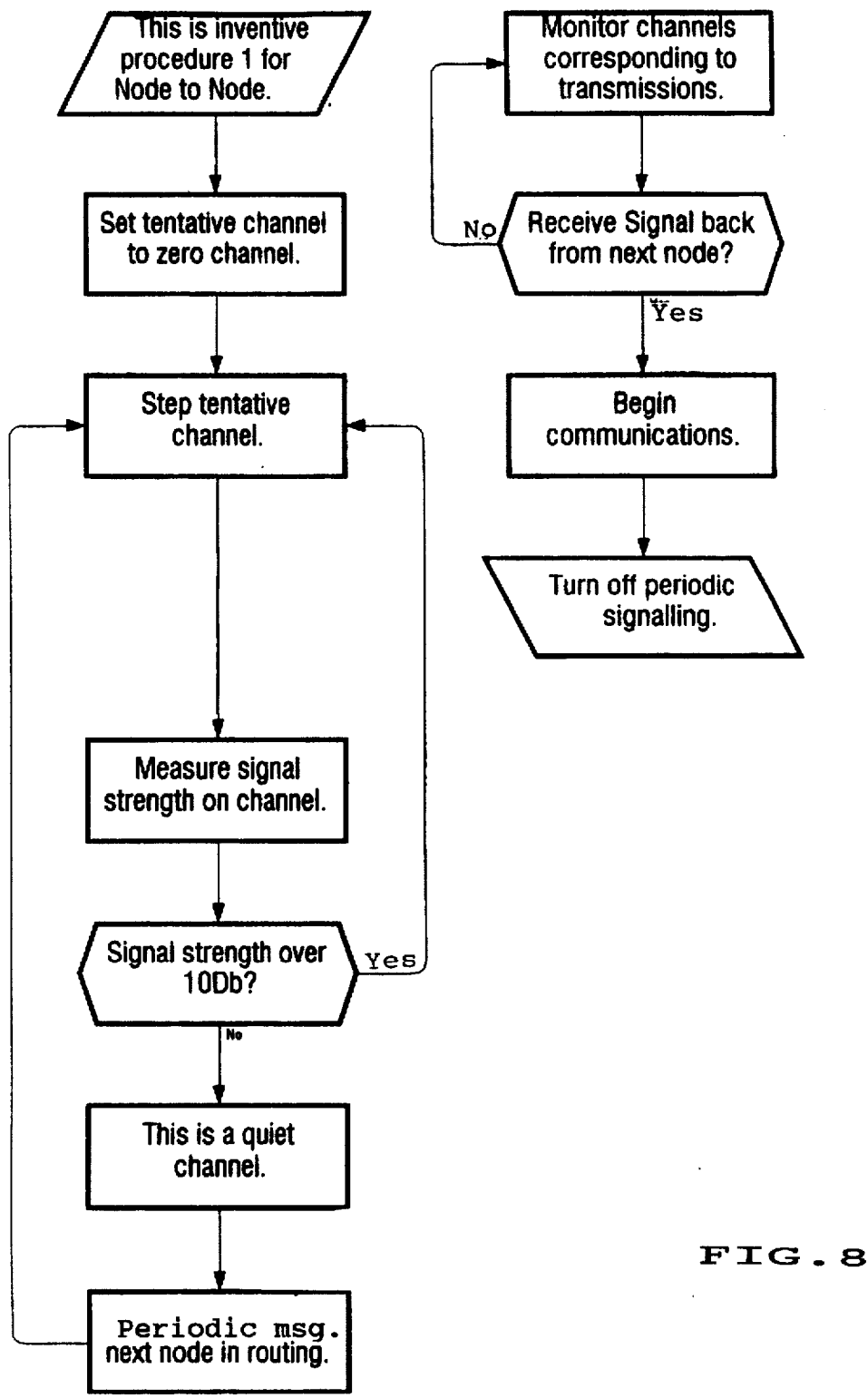
FIG. 8 is a flow chart showing the steps in procedure 1 for the node to node links.
Figure 9:
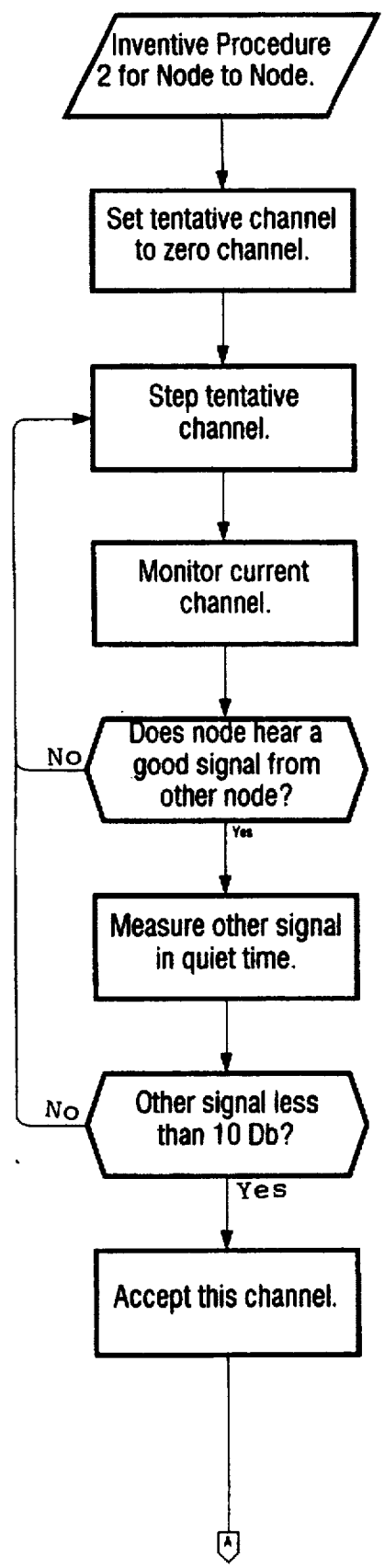
FIGS. 9 and 9A is a flow chart showing the steps in procedure 2 for the node to node links.
Figure 9A:
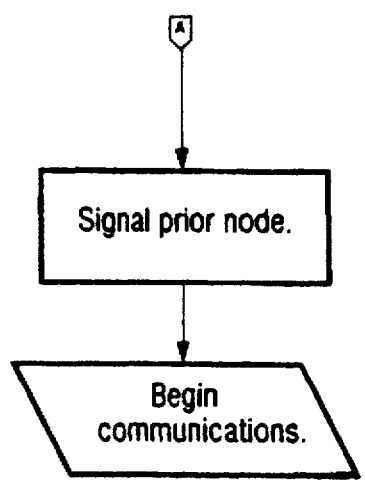

Refer to FIGS. 7 and 7A for a flow chart of this procedure. The rationalization for this decision is as follows. If the Deerfield remote clearly heard a message signal on the tentative pair that is over 30 Db above threshold, the Deerfield remote knows that it will in fact receive a good communication signal on that channel. This passes test 2.

When the Deerfield remote listens in the time between the periodic transmissions and hears a signal less than 10 Db over threshold the remote knows it would not interfere with that other user pair because the remote knows a priori that their desired signal is greater than 30 Db over threshold, and that due to signal reciprocity, this his signal would arrive at less than 10 Db over threshold. This passes test 4.

Consequently, this procedure passes both tests 2 and 4. The passing of these two tests will insure that the desired to undesired signal ratio will be at least 20 Db. This is sufficient for FM radio signals to capture.

This remote, upon passing procedure 2, signals the desired node, and begins interference free communication.

As explained above, implementation of the two aforementioned procedures will pass the tests and is sufficient to insure good interference free radio communications. It has been found that most system users prefer a system busy signal, as opposed to getting an assignment that is very prone to channel disconnect due to interference.

In the present invention, the only requirement is that all ongoing conversations be at least 30 Db over threshold, and that the procedures eliminate channels that are have over 10 Db of signal on them. In contrast, certain prior art required adding tones and digital data streams to all ongoing conversations for assuring interference free channels.

The two procedures are most useful in areas where call quality is the most important consideration. The previously described four tests provide a very spectrally efficient method of assigning channels where spectrum is very limited, and large numbers of users are anticipated.

Currently, the cellular industry is writing a number of standards that will permit multiple vendors to supply cellular systems components to the same customer. In addition, there are multiple standards being written for the air interface. The air interface refers to the various protocols that are used to signal and utilize the radio spectrum such as from a mobile to a cellular base site. One of the ideas currently being added to the standards is the concept of the mobile participating in the channel assignment process. The two procedures described above for channel assignment are intended to be compatible with proposed air interface standards.

When a user contacts a node and desires to call a number for which there is no prefix in the node computer, the land node routes the call to the exchange drop with the least number of links. Although the preferred embodiment for this invention is to work with multiple exchanges at different locations each with multiple prefixes, the invention can be used with a single exchange having multiple nodes.

Because a remote user is routed directly to the exchange carrying the desired prefix, land line charges will be minimal. Land line phone users typically under selected calling plans, get free calling within a certain radius. Consequently, in this example, if the remote user in Deerfield would have routed to the closest exchange drop in Northbrook, the user would have been subject to land line charges from Northbrook to Round Lake. However, in this particular example, the user would connect directly to Round Lake, and avoid the long distance charges from the local phone company.

Since the physical location of the nodes is not part of the routing procedure, the call routing system will work with nodes in either standard grid patterns or in patterns that might be chosen based on other criteria.

CALL CONNECTING AND CHANNEL ASSIGNMENT

The process of using the previously created routing information in conjunction with measured signal strengths that connects the call between nodes will now be explained.

The invention addresses the channel selection process and considers the following factors:
  a) Nodes can not transmit and receive in the same band
  b) Channels must be assigned in pairs
  c) Call set up must be prompt
  d) Channels chosen must not cause interference
  Channels chosen must not receive interference In the example of FIG. 1 the remote user in Deerfield wants to connect to phone number prefix 546 which is handled by the Round Lake exchange. The first step is for the Deerfield user to establish connection with a node near Deerfield with an acceptable signal quality and interference situation. This connection has been explained above. In the example in FIG. 1, this radio connection is made with node 1133. Once this connection is established, the node 1133 now must begin the process of connecting the call to Round Lake. As explained above, node 1133 has in its memory the node it must contact to establish the first link in the route to Round Lake.

Figure 5:
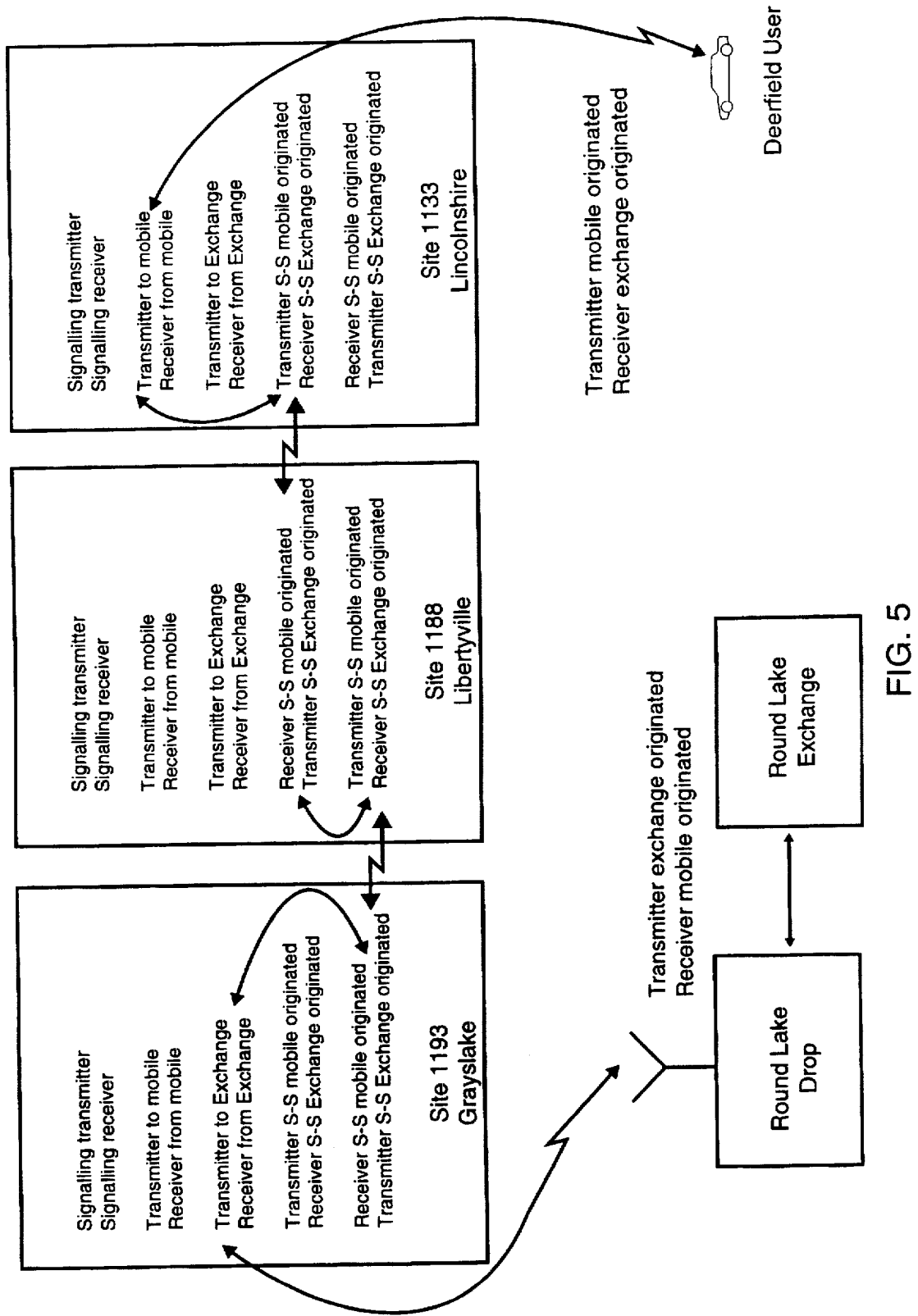
FIG. 5 is a diagram showing the receivers and transmitters that are present in a remote, base site(s), and a drop (exchange) location.

Refer now to FIG. 5 which shows, in additional detail, the communications paths between a mobile (remote) user in Deerfield and a drop near the exchange in Round Lake that handles the phone number prefix 546. As will be appreciated, the land drop will connect to the Round Lake exchange by standard land line methods.

Each of the odd numbered nodes, 1133 and 1193, contains the following components:

TABLE XIII

| | |
|---|---|
| A1 | Signaling transmitter (TR) for call routing procedure |
| A1 | Signaling receiver (R) for call routing procedure |
| A2 | TR for voice communication to a remote |
| A2 | R for voice communication from a remote |
| A3 | TR for voice communications to exchange |
| A3 | R for voice communications from exchange |
| A4-O | TR for sending voice Communications from node to node for remote originated voice |
| A4-O | R for receiving voice communications from another node for exchange originated voice |
| A5-O | R for receiving voice communications from another node for remote originated voice |
| A6-O | TR for sending voice communications to another node for exchange originated voice |

The even numbered nodes (1188 in FIG. 5) contain the same number of components, but the node to node transmitters and receivers are reversed to transmit and receive in different bands as indicated above. Thus each of the even numbered nodes contains the following components:

TABLE XIV

| | |
|---|---|
| A1 | Signaling transmitter (TR) for call routing procedure |
| A1 | Signaling receiver (R) for call routing procedure |
| A2 | TR for voice communication to a remote |
| A2 | R for voice communication from a remote |
| A3 | TR for voice communications to exchange |
| A3 | R for voice communications from exchange |
| A4-E | R for receiving voice communications from node to node for remote originated voice |
| A4-E | TR for sending voice communications to another node for exchange originated voice |
| A5-E | TR for sending voice communications to another node for remote originated voice |
| A5-E | R for receiving voice communications from another node for exchange drop originated voice. |

The system and method for setting up a call through various nodes are related to the method described above for connecting the remote to node. FIG. 5 shows the example of a call between a mobile (remote) user in Deerfield and an exchange drop in Round Lake that is being routed through a total of three different nodes. The new process of setting up the call between multiple nodes will be explained hereinbelow. Although the channels in the above tables and FIG. 5 are designated as voice channels, various data can be transmitted through such channels as is well known.

As indicated in FIG. 5, for the node to node communication bands, the odd nodes have transmitters which operate in the bands where the even nodes have receivers. Conversely, the odd nodes have receivers which operate in the bands where the even nodes have transmitters.

As will be more fully explained herein, the mobile (remote) can originate communications on channel pair say 1 in bands G and H, and the communications from node 1133 to node 1188 will be on a channel pair say 14 in bands C and D, and the communications from node 1188 to node 1193 will on a channel pair say 17 in bands E and F, and the communications from node 1193 to the drop of exchange including prefix 546 will be on a channel pair say 3 in bands A and B.

Tests are performed to ascertain that any channel choice will be both interference free and non interference causing. The channels chosen conform to the route as explained above.

Referring still to FIG. 5, the first step in the process is for the first node, in this case node 1133 located in Lincolnshire to establish a link with the next node. To facilitate this explanation, let us assume the following is the optimum route:

TABLE XV

| |
|---|
| Mobile (remote) user in Deerfield |
| Node 1133 located in Lincolnshire (Odd) |
| Node 1188 located in Libertyville (Even) |
| Node 1193 located in Grayslake (Odd) |
| Drop located in Round Lake |
| Exchange located in Round Lake |

In the present system nodes are deployed in sufficient quantity to provide good radio coverage to the remotes. Nodes are given extra antenna height, extra power, and nodes are deployed in sufficient density to insure good radio coverage, and node to node communication is usually not limited by poor propagation paths. In the present invention, the nodes are located in a random manner or manner dictated by providing good radio coverage to remotes and interference between nodes could be a problem. However, by a unique system, and method of operation, the present invention provides interference free node to node communication, as will be explained hereinbelow.

As in the remote to node channel assignment procedure described above, the minimum acceptable signal strength for node to node communication is set at a high threshold of say, 30 Db.

Refer to FIG. 1 where Lincolnshire node 1133 is trying to establish a communication path to node 1188 in Libertyville. The four tests as mentioned above are used again specifically as follows:

Test 1 Will the transmission from node 1133 interfere with any other node reviver?

Test 2 Will node 1188 receive an interference free signal from node 1133?

Test 3 Will node 1188 interfere with any other node receiver?

Test 4 Will node 1133 receive an interference free signal from node 1188?

Procedure 1

Figure 18:
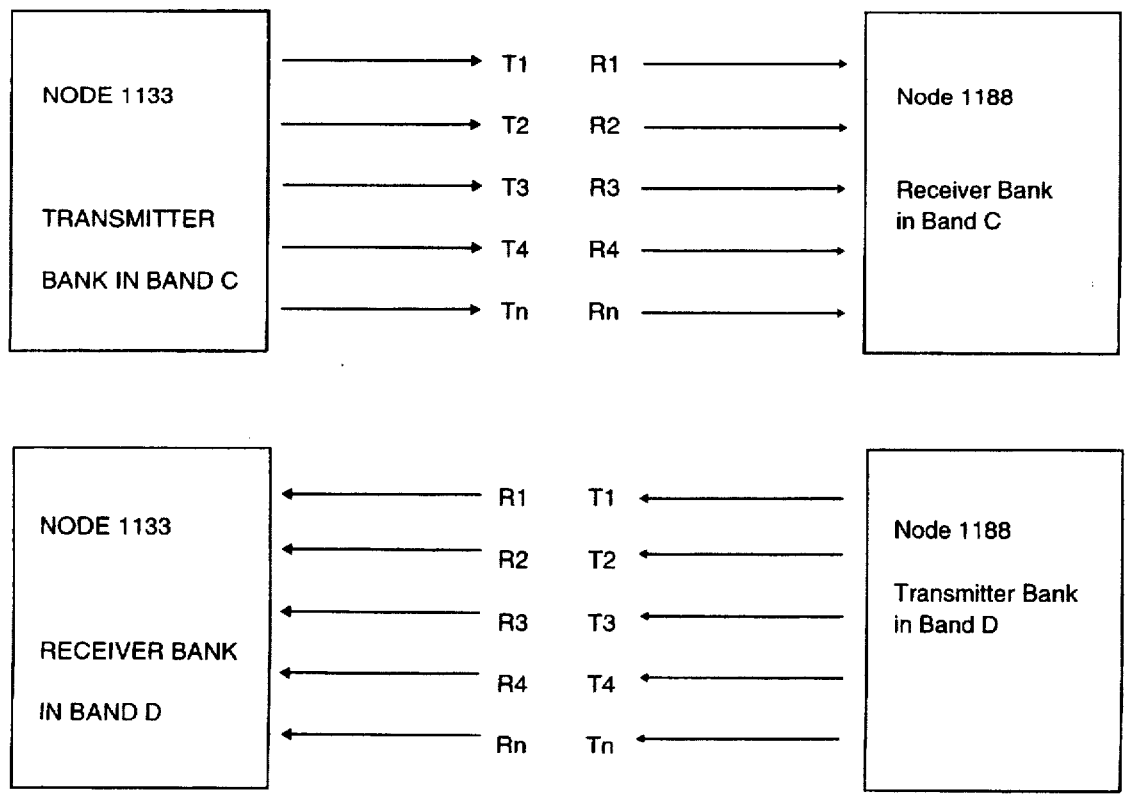
FIG. 18 is a diagram showing the transmitter and receiver channels for associated odd and even nodes.

Refer to FIG. 18. Node 1133 knows that it must establish a link to node 1188. Node 1133 monitors a tentative channel, say channel R1 in band D, and measures the signal strength received on that channel.

Node 1133 passes procedure 1 if the measured signal strength is less than 10 Db. If the measured signal strength is over 10 Db, node 1133 attempts another channel.

Figure 13:
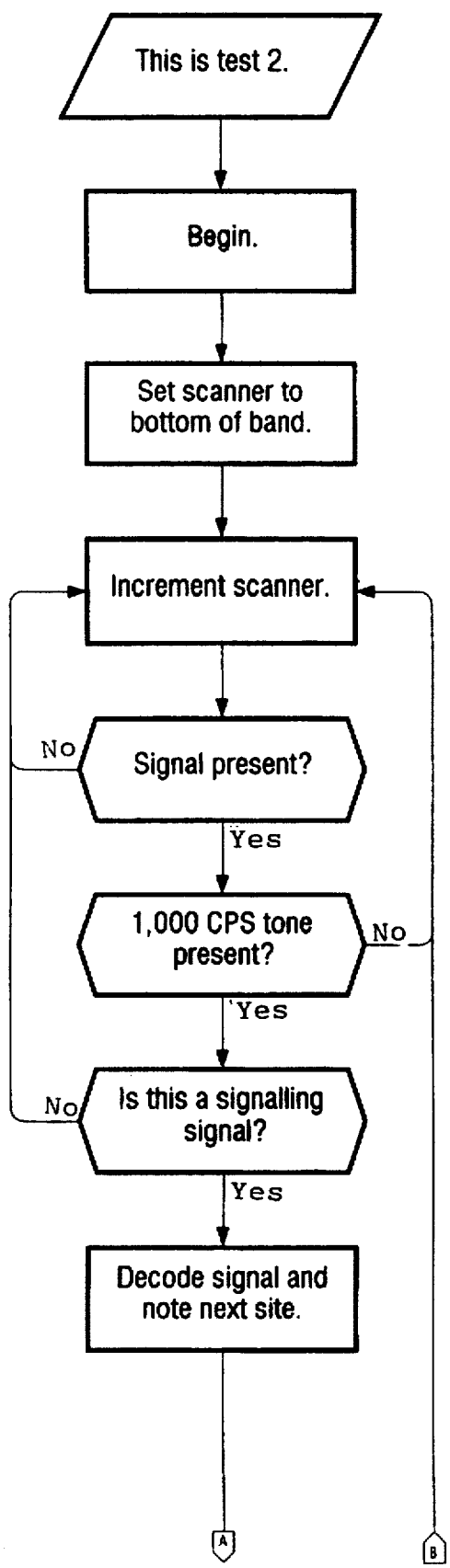
FIGS. 13 and 13A is a flow chart showing the steps in test 2.
Figure 13A:
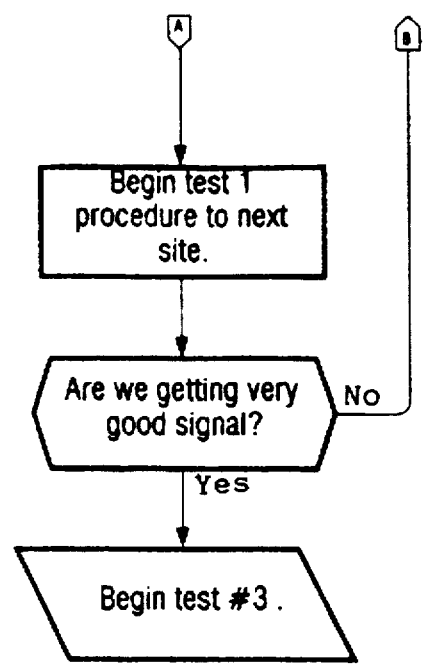

Refer to FIGS. 13 and 13A for a flow chart of this procedure. The rationale for this procedure is as follows. If the undesired signal is less than 10 Db it will not interfere with the receiver at node 1133, as node 1133 knows a priori that the desired signal will be stronger than 30 Db. This automatically passes test 4.

If the undesired signal is less than 10 Db, node 1133 knows due to signal reciprocity that its transmission will arrive at the active users receiver at less than 10 Db. Since the other users are communicating at over 30 DB desired signal level, node 1133 knows that it will not interfere with any other conversation, and this passes test 1. Consequently, this simple procedure passes both test 1 and test 4.

If 1133 passes procedure 1, it begins to transmit periodic messages to node 1188 on the tentative channel in the pair. This transmission occurs in band C.

TABLE XVI

| Description of partial contents of periodic message | |
|---|---|
| Originating Node | 1133 |
| Next Node in Routing | 1188 |
| Phone number of remote | YYYYYYYY |
| Desired Destination number | 708-546-XXXX |

Also, since 1188 might not hear this periodic message because of interference, node 1133 steps to the next channel R2, and repeats this procedure; that is, the node 1133 steps to the next channel R2 and listens and measures the signal strength on that channel, and makes another decision. Consequently, if node 1133 passes the procedure 1 for channel R2, it will also transmit periodic messages on that corresponding channel (T2) simultaneously. The number of simultaneous transmissions of these messages on different channels by the node 1133 is limited to five channels.

Node 1133 also monitors the receiver channels in band D on the receiver channels paired to its message transmissions. For example, if it is sending a message on channel T1 in band C, it will be monitoring channel R1 in band D. If it hears a transmission from 1188 (as will be described below), the link is established. When 1133 hears a message from 1188, it cancels its other tentative transmissions.

Procedure 2

Node 1188 is monitoring potential channels in band C for a link from an arbitrary node. If node 1188 hears a good signal from node 1133 on a particular channel, then node 1188 measures the signal strength in the period between the periodic transmissions. If the signal in the period is less than 10 Db over threshold, then node 1188 accepts the channel and signals back to node 1133 on the corresponding channel in band D that they have established communications. If the signal in the period between transmissions is over 10 Db over threshold the channel is not accepted, and node 1188 monitors other channels. If node 1188 can not hear this transmission from 1133, 1133 will in the meantime monitor other channels.

When node 1188 hears a good transmission, it has passed test 2.

Figure 14:
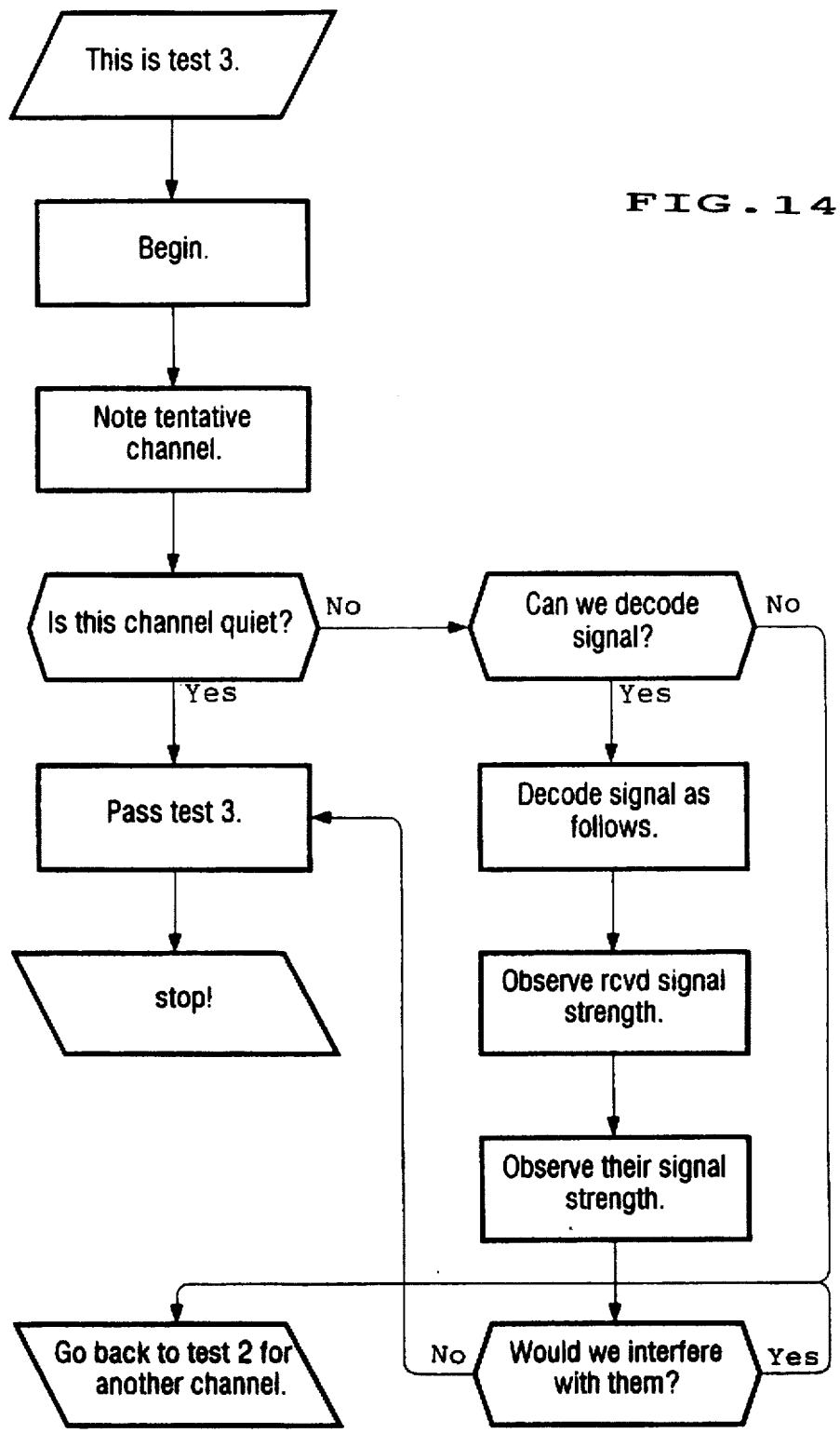
FIG. 14 is a flow chart showing the steps in test 3.

When node 1188 measures the signal strength in the period between periodic messages and learns that it is less than 10 Db over threshold, node 1188 knows it will not interfere with the other users. Due to signal reciprocity, the received signal from node 1188 at the other users receiver would be less than 10 Db over threshold. Node 1188 knows a priori that the other desired signal is over 30 Db over threshold. Consequently, node 1188 knows it will not interfere with that previous user. This passes test 3. Refer to FIG. 14 for a flow chart of this procedure.

Thus, implementation of the two aforementioned two procedures will pass the four tests.

Furthermore, the requirement of adding tones and digital data streams to all ongoing conversations is eliminated. The only requirement is that all ongoing conversations be at least 30 Db over threshold, and that the procedures eliminate channels that have a signal over 10 Db over threshold.

As alluded to above, the node to node communications bands are Bands C,D,E,and F. The selection of a channel pair between node 1133 (Lincolnshire) and node 1188 (Libertyville), is independent of whether node 1133 received this routing demand from a remote or from another node. The routing and channel selection process works such that the routing and channel selection process originates with node 1133 and works towards node 1188 and node 1193.

Channel Assignment for the Second and Following Node to Node Links

The process that node 1188 (Libertyville) goes through to establish channel selections with node 1193 (Grayslake) are identical to the processes just described. However, since node 1188 is an even number node, it does its scanning and tentative transmissions in a different pair of bands. Site 1188 will tentatively transmit in band E and listen in band F.

Once the call reaches the final node 1193 (Grayslake), it is connected to the drop near the Round Lake Exchange in a manner similar to that described above in the node to remote communication. In the process of connecting a node to a drop, the direction of control is from the node to the drop. This direction is the reverse of the direction that is used to connect a remote to a node. The method is essentially similar to the method used to connect the remote to the node, but the call and control is initiated in the node. Two separate bands (Bands A and B in Table I) for node to drop is included as described above in the system. As will be appreciated, the remote to node signaling and communication is placed inn one pair of bands, and the node to drop signaling and communication is placed in another pair of bands.

If a node receives a connection from a remote that desires to communicate with a prefix that is not in the routing table, the node will connect the call to the drop with the least number of links in the route as described above. Since the computer in each node knows the number of links to each drop, the computer can choose a nearby drop. In effect when a call arrives for a new prefix, the computer has established a route to a nearby drop and the call is processed as above.

If the operator of the wireless system described herein wants to avoid using the local phone company for long distance calls, the drops to the connection points to the long distance carrier would participate in the route establishment procedure as described above. They would use an arbitrary prefix such as 900 to indicate a drop for connection to long distance.

In most installations of the above system, the system will be installed in a single area code. However, to install a system in an area that is serviced by multiple area codes, the area code and the prefix must be utilized together as a single destination in the routing as described above.

Handoff

When an active remote user such as a vehicular user moves from one geographic area to another area, his call is handed off between nodes. Hand off is an important part of the present system, and is performed when signal quality or signal strength falls below a predetermined level. Handoff involves the process of disconnecting a mobile (remote) user from one node, and connecting the mobile (remote) user to a second node. The node with the strongest signal is selected to receive the handed off call.

In certain prior art a central controller or central switch is employed in the handoff process. In certain other prior art a central processor and local area controllers control the handoff process. This central controller and local area controllers are in addition to the regular land line telephone switch. This second switch or second switch and associated local controllers are expensive, and they are part of the reason for the high air time cost of cellular radio today. There have been proposals that the various land line telephone switches assume responsibility for the hand off process. However, in many radio telephone systems, the land line telephone switch is owned by one company, and the cellular radio system is owned by a second company. Without standardization, regulation, and cooperation, the possibility of using the regular land line telephone switch to handle cellular radio functions seems difficult.

Because of the complexity and high cost of the multiple switches to provide mobile radio telephone service, various industry sources have indicated that a decentralized system similar to today's cordless phones be employed as an alternative to today's centrally controlled systems. Such a decentralized system would have no central computer or controller and would function without any central control.

The present invention includes a system and method for handoff in a decentralized system without the aid of either a cellular switch or a cooperative land line switching center. The handoff is accomplished by providing all the needed information to one of the nodes or exchange drops. The exchange drops and nodes then can control the handoff process.

For the handoff procedure, each node and drop keeps a list of active conversations that includes the phone number of the concerned remote. Technology for the maintenance of an online data base is well known.

Figure 10:
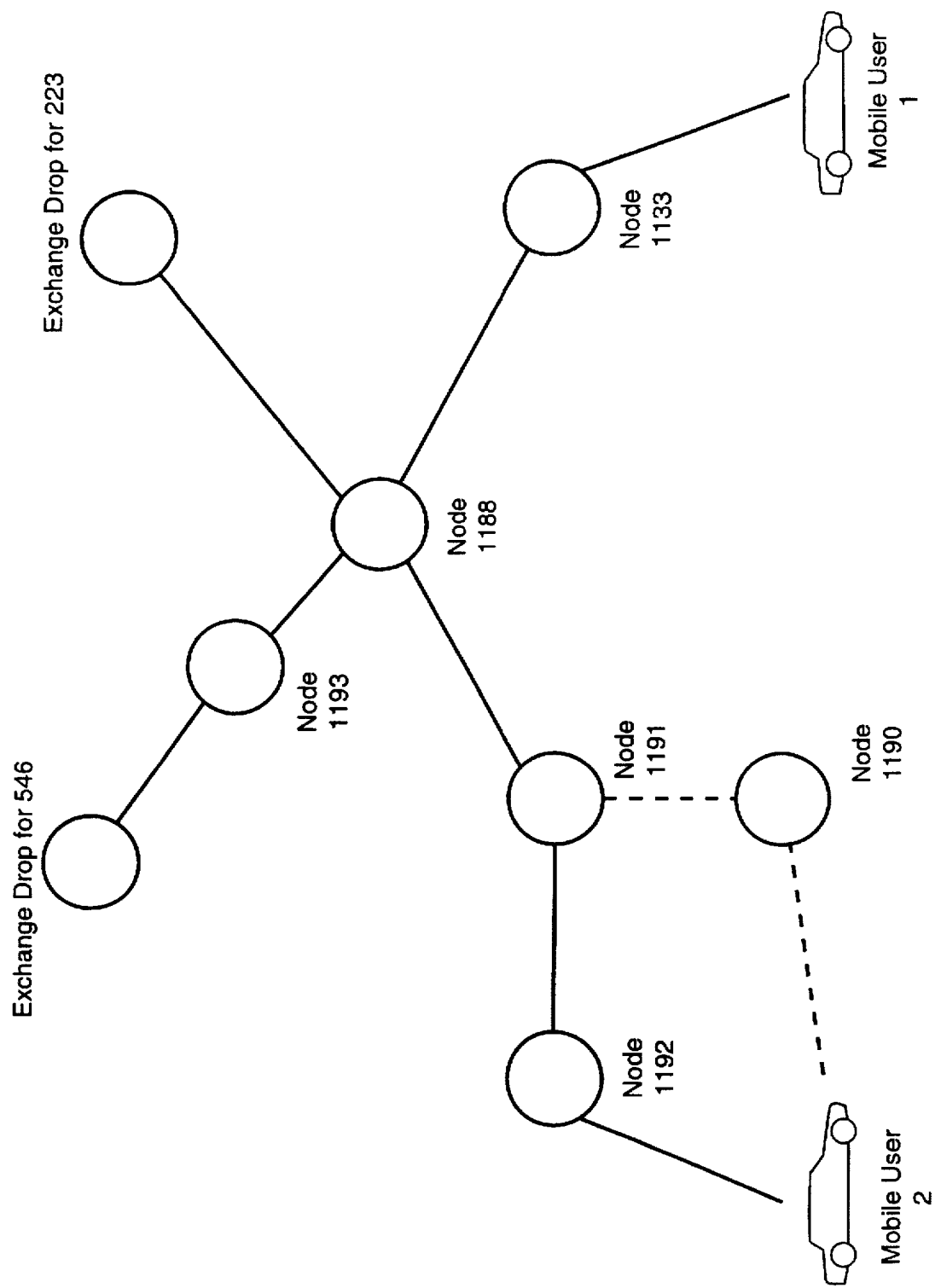
FIG. 10 depicts a remote radio telephone system without a central controller in accordance with the hand off feature of the invention.

Refer to FIG. 10. FIG. 10 shows mobile (vehicular) mobile user 2 making a call through node 1192. These drops are positioned such that there is a maximum of one drop per land line phone exchange. Each drop or node can handle many simultaneous conversations. The maximum number of calls handled by a node or drop is only limited by the radio spectrum available for the system. Land line phone exchanges are well known phone company local switches. Mobile (remote) user 1 and mobile (remote) user 2 two contain transmitters and receivers units required to make a radio telephone call.

Note that the connection between user 2 and node 1192 is a radio link, as are all other links in the system of FIG. 10. Also note that User 2 is talking to the 223 exchange, and is being routed from Node 1192 to Node 1191 to Node 1188 and onto the exchange drop for 223.
User 2 to Node 1192 to Node 1191 to Node 1188 to Exch drop 223

Also note that user 1 is making a call to the 546 exchange and is talking to Node 1133 which is in turn connected to Node 1188 and to Node 1193 onto exchange drop for 546.
User 1 to Node 1133 to Node 1188 to Node 1193 to Exch drop 546

Note that Node 1188 has two different calls each going to different destinations. This example typifies the type of complexity that occurs in large systems.

Now, let us assume that User 2 is moving away from Node 1192 and getting closer to Node 1190. His signal quality is decreasing, and he consequently needs a handoff.

User 2 follows the call initiating procedure as recited above. User 2 determines, per the procedures described above that he needs a new channel, and that the Node 1190 should be utilized.

Node 1190 accepts the call. Node 1190 notes that this call is to be directed to exchange 223 and consequently to the exchange drop for 223. At this point node 1190 does not know if this is a new call that has to be routed to exchange Drop for 223, or if this is a handoff that needs to be routed to exchange Drop 223. Based upon the procedure described above for routing, Node 1190 does know that it has to route to Node 1191. Therefore, Node 1190 establishes a new interference free radio link to Node 1191 as described above. Consequently, Node 1191 now has established the link from Node 1191 for Mobile User 2.

However, before Node 1191 continues to route the call per the routing procedure as described above, Node 1191 performs the step of checking through a list of calls in process. Node 1191 searches his list of calls for a matching phone number of the new mobile, remote user 2. If Node 1191 recognizes this user as being part of another call in process, then Node 1191 knows that it must perform a routing modification. Consequently, Node 1191 connects the new audio or data signal coming from Node 1190 and disconnects the old audio for this user coming from Node 1192.

This completes the handoff procedure. Note that there is only one drop point per each exchange. If multiple drops were to access a single exchange, it is possible that a new route established as a result of a handoff would not use the same nodes, and consequently, the list search mentioned above would not show that this was a call in process, and handoff and substitution need would not be detected.

All nodes and drop points perform this list search step of searching for existing conversations involving any new call. Consequently, the handoff and signal substitution can be performed by any one of the nodes along the radio route, and also the handoff and signal substitution can be performed by the drop. Since the procedure insures that the handoff is controlled as near as possible to the remote, many times radio links nearer the drop point are not even involved and nodes and drops near the exchange are not aware that a handoff occurred. Accordingly, the complete route set up need not be performed.

Figure 11:
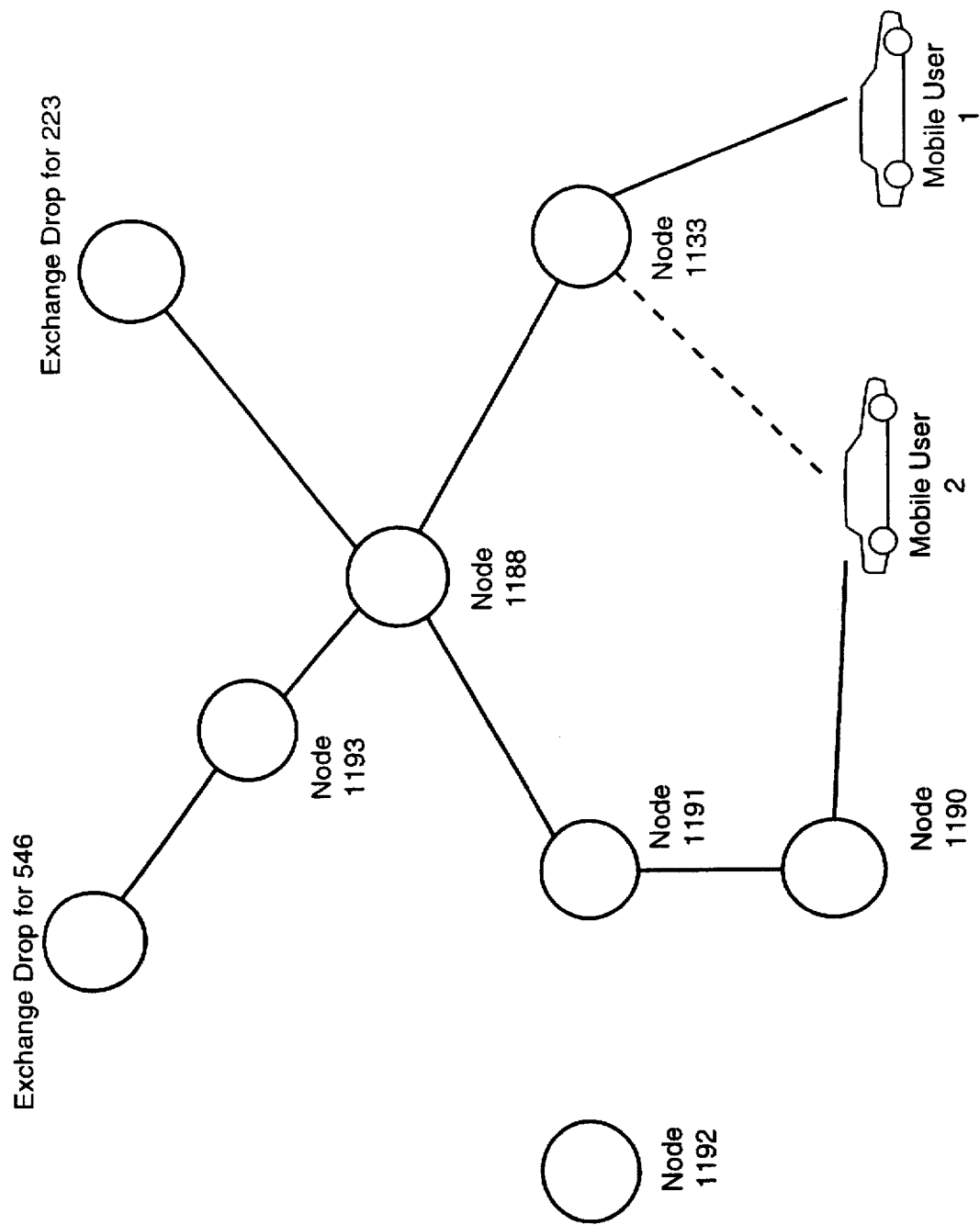
FIG. 11 depicts the same system as in FIG. 10 with one of the remote users in a different place.

Now, refer to FIG. 11. FIG. 11 shows that Mobile User 2 has continued to move, and that he is now leaving the vicinity of Node 1190 and arriving in the vicinity of Node 1193. Because the received signal from Node 1190 is getting weak, a handoff is indicated. Mobile User 2 now begins the procedures as explained above. Mobile User 2 now sets up the call through Node 1193. Node 1193 now performs the radio routing as explained above. This is a new call to Node 1193, so node 1193 routes the call on to Node 1188. Node 1188, however, recognizes the mobile (remote) number as previously having a conversation coming in from Node 1191. Consequently, Node 1188 disconnects the call from Node 1191, and connects the call coming in from Node 1193. The call is continuously routed to the exchange drop for 223. This completes the handoff.

Note that the first handoff was controlled at Node 1191 when the mobile (remote) moved from the vicinity of Node 1192 to Node 1190. The second handoff was controlled by a different node, in this case Node 1188, when the mobile (remote) moved from Node 1190 to Node 1193. Note that this procedure does not effect Mobile 1 who is routing through Node 1133 and Node 1188 onto Node 1193 onto the drop for 546.

Land Line Originated Call

In the previous example, a remote (mobile) user in Deerfield initiated a phone call to a land line user in Round Lake. We now describe the process for a land line user in Round Lake to initiate a call to a remote (mobile) user in Deerfield.

In today's cellular the central switch is given an exchange number. When a land line user wants to call a cellular user he dials the phone number of the cellular user which includes the exchange number of the cellular central switch. The call is then connected to the cellular switch which handles the call set up process. In the decentralized system described herein, each remote user in the system is given a unique number with the prefix corresponding to an exchange number corresponding to the decentralized system. However, any one of the drop points will suffice for the call set up process. Consequently, when the land line user dials the decentralized exchange number, the local land line exchange merely connects to one of the nearby drops. This saves land line charges in that the call is connected locally to the decentralized system.

The drop and the Deerfield mobile, then perform the following steps:

a) The drop temporarily holds the call
b) The drop pages the user city wide
c) The Deerfield remotes initiates a call
c) The Drop connects and completes the call Step a. When a drop receives in incoming call for a remote user, the drop temporarily holds the call.

Step b. With another outgoing land line, the drop connects to the city wide paging system, and the drop sends the paging system a page message containing an exchange number at the drop and an arbitrary fictitious phone number within the exchange. For example, the drop located at Round Lake would send the following message to the paging computer:

a) Exchange 546
b) Number 0000 or perhaps A001
c) The number of the remote (now in Deerfield)

The city wide paging system then broadcasts over the entire metropolitan area the paging message contents listed above.

Step c. The Deerfield remote, upon receiving the page, then initiates a call in an identical manner to when the Deerfield remote were the initiating party.

Step d. When the Deerfield call finally is routed to the correct drop, the drop notes the artificial phone number, and connects the Deerfield call back to the proper land line user.

Remote User Calling Remote User

When a remote user in Round Lake desires to call a remote user in some unknown location, the Round Lake remote user enters the decentralized system in the manner described above. However, the first node notes that the phone number corresponds to a remote phone in the decentralized system. The first node then routes the call to the nearest drop.

The nearest drop then proceeds in an identical manner as if for a land line initiated call including the holding and paging process described above. When the call comes back from the remote in the unknown location, the drop then connects the call.

Roaming

When a drop initiates a page, and the remote user does not come back in the form of a routed call, the drops knows that the unit is inoperable, or that the unit has roamed out of town. The drop then contacts central data base of roamers and asks for the location of the desired mobile. The drop then can either inform the calling party that his desired remote is inoperable, or else the drop can connect the call to the correct out of town switch.

When an out of town user arrives in town, the out of town user notifies the closest node of his presence, and that node sends that information to a drop by setting up a short duration phone call in the manner described above. The drop then notifies the central data base of roamers that the out of town user has arrived in this area. Now, any land line phone call directed to any one of the local drops can page an out of town user and set up a call.

In a large metro area like Chicago metro area, several different area codes are involved. The drop actually notifies the central data base of roamers which area code to use to connect to the decentralized system.

It takes a minimum of two different types of nodes such that communication can occur. In the preferred embodiment two different types have been chosen; in other embodiments, three or more different types might be chosen. In the two type configuration, the odd nodes can communicate with the evens and the evens can communicate with the odds.

Customer Billing

Customer billing systems are well known. In this particular invention each of the drops keeps a record of all calls. The drop are polled by a billing system as is well known, and a centralized billing system implemented.

Embodiment B

Another application of this invention occurs in large corporate complexes. Frequently, in large corporate complexes, there are several buildings involved, and thousands of employees. Many of these employees want to carry Personal Digital Assistants better known as PDAs. PDAs are basically a combination of a computer and a radio link.

In the corporate complex application, there are multiple digital computers that are referred to as host computers. These computers correspond to the drop points in embodiment A. Also, there are multiple PDAs that correspond to the remotes in embodiment A.

Each host computer is given a unique identified that corresponds to the exchange and prefix number in embodiment A.

The nodes as described in embodiment A are called repeaters in this embodiment. These repeaters are placed in the corporate complex such that all important areas are given good radio coverage. Because of the problems of radio communication in buildings caused by steel reinforced concrete walls and floors, many repeaters must be installed. Typically, a repeater is installed in each large room.

To permit complex wide communication, repeaters are installed such that each repeater can view at least one other repeater of the opposite odd/even designation.

In the corporate complex a complete communication system can thus be installed that will permit any PDA to contact any host computer. Any PDA can contact any host computer by merely indicating the number of the host computer.

Because the bands used by the host computers are different from the bands used by the PDAs, host computers can not contact host computers directly, and PDAs can not contact PDAs directly. However, host computers that desire to contact other host computers, can install a second bank of transmitters and receivers with the extra bands such that the host computer would initiate communication as if it were a PDA.

Embodiment C

Embodiment C provides a channel assignment which is related to the above described routing and two procedure system, and in addition includes additional specific tests for assuring free channel assignment as might be required in a more congested or populated area.

Embodiment C uses a decentralized signal to interference method as explained in U.S. Pat. No. 4,965,850 and improved in U.S. patent application Ser. No. 08/276,781. As with the two procedure system described above preplanning of the various links back to various drop points is not required. Basically embodiment C is the same as embodiment A, and the two embodiments operate similarly, except that in this embodiment four detailed tests are used to determine if a channel can be used without interference. This change will permit greater frequency reuse and greater spectrum capacity. This change will also allow links with signal strength below 30 Db to be used satisfactorily.

In the following explanation, in order to avoid duplication, only the differences between the two embodiments will be emphasized. As mentioned above, the two embodiments are similar.

Refer to FIG. 1 which shows a number of nodes in an example area in the United States. In the explanation of this embodiment, the propagation losses are assumed to be as shown in the following tables. Note that the following table, Table XVII, is slightly different than Table I. As described above with respect to the two procedure embodiment it is assumed that a remote user in Deerfield wants to contact a Round Lake exchange.

TABLE XVII

| Spectrum | Band Name | Function | Odds | Evens |
|---|---|---|---|---|
| 1 Megahertz | Sig | Signaling | T & R | T & R |
| 2 Megahertz | A | Node to Drop | T & R | T & R |
| 2 Megahertz | B | Node to Drop | R | R |
| 1 Megahertz | C | Node to Node | T & Q | R |
| 1 Megahertz | D | Node to Node | R | T |
| 1 Megahertz | E | Node to Node | R | T & Q |
| 1 Megahertz | F | Node to Node | T | R |
| 2 Megahertz | G | Mobile to Node | R | R |
| 2 Megahertz | H | Mobile to Node | T & Q | T & Q |

Table XVII is generally similar to Table I, however, Table XVII includes Q which refers to the transmissions that occur in the implementation of test 1 as will be described herein.

In the above Table XVII, the bands for radio communication are shown. The Sig Band is a signaling band that is used for the route establishment process that will be explained herein. The Node to Drop bands A and B are used for communication to drops that function as control points as will be explained herein. The bands A and B operate in a similar manner as the bands for communication with the remotes. Bands C,D,E, and F are used for communication links between nodes. Bands G and H are utilized to communicate between the remotes and the nodes.

Call Routing

The first step in connecting a call to a desired drop point is to establish the route. It should be noted again that the nodes can be placed in any pattern, and need not be placed in a grid pattern. This is an important feature of the invention in that nodes can be placed anywhere. When nodes have to conform to a grid pattern, available sites may not be present at the desired location.

As described above, in the signaling band, all nodes can both transmit and receive. The signaling band is divided into a series of time slots. There are 5,000 time slots in the signaling band. The first 1,000 slots are reserved for land drops or exchanges. The remaining 4,000 slots are reserved for cell sites or nodes.

Each desired drop point is given a sequential number between L1 and L999. These sequential numbers also correspond to the time slot number. Consequently, the maximum number of drop points in the system is 999.

Each node is given a sequential number between 1001 and 5000.

The following table which has been abbreviated is essentially similar to Table II and depicts a typical usage of the various time slots:

TABLE XVIII

| Time Slot No. | User of Slot |
|---|---|
| 1 | L001 (Located in Round Lake) |
| 2 | L002 (Schaumburg) |
| 27 | L027 (Antioch) |
| . | . |
| . | . |
| 1001 | 1001 (Arbitrary land node) |
| . | . |
| . | . |
| 1133 | 1133 (Lincolnshire land node) |

The particular example shown in FIGS. 1 and 3, and Table III can also be used in this explanation of Embodiment C.

Step One of Call Routing

The first step of call routing for this embodiment is similar to the step one of call routing for Embodiment A described above and Table IV can be used for this explanation. The first step is for the various drops to transmit a routing message in their unique time slot as described above, and the message contains the information listed in Table IV.

Step Two of Call Routing

Although the number will vary, approximately 12 different nodes might receive this transmission. Since node antennas are higher than remote antennas, it is usually the case that node to node communications occur over greater distances than remote to node communications. Signals received less than 10 Db over threshold are ignored. Such signals are considered too weak to provide satisfactory service in a potential multiple link environment.

Refer to FIG. 3 and Table III. For example, node number 1193 (Grayslake) might hear and record the following messages received from various nodes and drops. The signal strengths and corresponding node and drop information, exchanges, prefixes, and link numbers are loaded into a computer memory table in the node as follows:

TABLE XIX

| 1193 (Grayslake) | | | |
|---|---|---|---|
| Exchange | Prefix | Link | Signal Strength |
| L001 | 546 | 1 | 99 |
| L001 | 740 | 1 | 99 |
| L006 | 362 | 1 | 99 |
| L027 | 395 | 1 | 99 |

The current measured signal strength is also added to the table. Note the following table has different signal strengths than the corresponding table in the previous embodiment. The signal strengths were changed to facilitate explanation. The table now appears as follows:

TABLE XX

1193 (Grayslake)

| Exchange | Prefix | Link | Sig Str | New SignalStrength |
|---|---|---|---|---|
| L001 | 546 | 1 | 99 | 31 |
| L001 | 740 | 1 | 99 | 31 |
| L006 | 362 | 1 | 99 | 43 |
| L027 | 395 | 1 | 99 | 24 |

In the above limited example, node 1193 (Grayslake) heard only three different transmissions from drops. These three different transmissions contained a total of four different prefix numbers. As each transmission is received the signal strength is measured and recorded in the table above.

Step Three of Call Routing

The next step in the procedure occurs in the next cycle of the various time slots. Again, this step is similar to step three of call routing in Embodiment A. Each node transmits in its unique time slot all of the prefixes that it has heard. The nodes add their own number and transmit all of the information in the above table. For Example, node 1193 (Grayslake) would transmits the following during its unique time slot. Since each node is adding a link to all tentative routes, the link number for each route is increased by one. Refer to Table XXI. Only a portion of the transmission is shown.

TABLE XXI

| | |
|---|---|
| 1193 | Land node number |
| L001 | Exchange number |
| 546 | Prefix |
| 2 | Link number |
| 31 | Received signal strength |
| L001 | Exchange number |
| 740 | Prefix |
| 2 | Link number |
| 31 | Received signal strength |
| L006 | Exchange number |
| 362 | Prefix |
| 2 | Link number |
| 43 | Received signal strength |
| L027 | Exchange number |
| 395 | Prefix |
| 2 | Link number |
| 24 | Received signal strength |

Step Four of Call Routing

Refer to FIG. 3. This step is similar to step four of embodiment A. Various additional nodes hear the transmission from node 1193. They also hear transmissions from other nodes in their different time slots. Each node then makes a table of all the transmissions that it has received. Transmissions below 10 Db are ignored. A portion of this table might appear as follows for node 1188. Table XXII is similar to Table VIII.

TABLE XXII

Table for Node No. 1188 (Libertyville)

| Node | Prefix | Signal Strength | Link |
|---|---|---|---|
| 1133 | 480 | 18 | 2 |
| 1133 | 362 | 43 | 1 |
| 1134 | 480 | 17 | 2 |
| 1192 | 546 | 14 | 2 |
| 1192 | 740 | 14 | 2 |
| 1193 | 546 | 31 | 2 |
| 1193 | 740 | 31 | 2 |

TABLE XXII-continued

Table for Node No. 1188 (Libertyville)

| Node | Prefix | Signal Strength | Link |
|---|---|---|---|
| 1193 | 362 | 43 | 1 |
| 1194 | 546 | 12 | 2 |
| 1194 | 740 | 12 | 2 |
| 1195 | 546 | 11 | 2 |
| 1195 | 740 | 11 | 2 |

In the above example, node 1188 heard messages from six different nodes and drops. Included in those received messages were messages back from nodes about routes that already had passed through node 1188. Such routes are not optimum, and will be subsequently eliminated. In the previous cycle it had transmitted that it related to exchange 362, and two nodes 1193 and 1133 have transmitted that information back. Note in the above table that many signal strengths are below 30 Db. Relaxing the criterion in embodiment A of 30 Db minimum signal strength permits many more potential links to be considered.

At this point the new signal strength being received is added to the table as follows:

TABLE XXIII

Table for Node No. 1188 (Libertyville)

| Site | Prefix | Sig. Str. | New Sig Str. | Link |
|---|---|---|---|---|
| 1133 | 480 | 18 | 43 | 2 |
| 1133 | 362 | 43 | 43 | 1 |
| 1134 | 480 | 17 | 38 | 2 |
| 1192 | 546 | 14 | 17 | 2 |
| 1192 | 740 | 14 | 17 | 2 |
| 1193 | 546 | 31 | 43 | 2 |
| 1193 | 740 | 31 | 43 | 2 |
| 1193 | 362 | 43 | 43 | 1 |
| 1195 | 546 | 11 | 37 | 2 |
| 1195 | 740 | 11 | 37 | 2 |
| 1197 | 546 | 12 | 32 | 2 |
| 1197 | 740 | 12 | 32 | 2 |

At this point the node deletes from the table every message that it has received from an even number node. If this node would have been an odd numbered node it would have deleted the odd numbers. In the above example, two of the nodes that 1188 received from were even and they are deleted from the table. The reason for this deletion will become apparent later as the problem of transmitting and receiving in the same band is explained.

The next step is to sort the table into prefix sequence, and consequently, all of the messages about a selected prefix will be grouped together. For example, a portion of the above table would be as follows:

TABLE XXIV

Table for Site No. 1188 (Libertyville)

| Site | Prefix | Sig. Str. | New Sig Str. | Link |
|---|---|---|---|---|
| 1193 | 546 | 31 | 43 | 2 |
| 1195 | 546 | 11 | 37 | 2 |
| 1197 | 546 | 12 | 32 | 2 |

The next step is to select only the best link for each prefix. If two different routings contain a different number of links, the routing with the minimum number of links is chosen. The routing with the higher number of links is dropped from the table. Since only acceptable signal strengths above the preselected 10 Db threshold are entered in the table, this process selects a minimum number of links. This procedure of dropping routes with larger number of links will reduce the number of links in the final route. This procedure will also reduce the number of transmitters that are radiating power and consuming spectrum capacity.

The next step is to drop all sub-optimal links. Since received signal strength is very important to signal quality, the links with inferior signal strength are dropped from the table. The strategy is to drop the route that has the worst or weakest link. In the above table, the following is the worst link:

TABLE XXV

| | |
|---|---|
| 1193 | 31 |
| 1195 | 11 |
| 1197 | 12 |

In the above example, if 1188 (Libertyville) wanted to contact prefix 546, 1188 would have three choices. However, the route through 1193 (Grayslake) provides the best signal strength, and consequently that rout is chosen. The routes including 1195 and 1197 are dropped from the table. If two routings contained identical number for both signal strength and links, the one with the lower position in the table is chosen.

One key point in the procedure above is that each node has the capability through storage in its computer memory to provide at least one route to all prefixes that can be reached with a signal greater than the minimum threshold as described above.

Step Five of the Routing

At this point, the computer in node 1188 (Libertyville) increases the link number in its internal tables. The next step is for node 1188 to transmit the information in its computer memory table. As explained above, the node 1188 has already eliminated unsatisfactory links, and only transmits the best link for each possible exchange. This transmission occurs in the next master cycle.

A transmission at this step is as follows:

TABLE XXVI

| | |
|---|---|
| 1188 | Land node number |
| 546 | Prefix |
| 3 | Links |
| 31 | Signal Strength |

Note that node 1188 will also transmit the same messages about other exchange that were received via the same and other nodes.

Step Six through "n" in the routing

As described above in Embodiment A, node 1133 receives the transmission from node 1188 and stores the information contained in the transmission in its memory. Node 1133 also receives transmission from other nodes and other drop points near exchanges which it also stores in its memory. Node 1133 then performs the same steps that were performed by node 1188 to determine the optimum link to an intermediate node back to origin of prefix 546. This causes node 1133 to delete from its memory all of the non optimum links, and thereby node 1133 determines that the optimum route back to exchange 546 is through node 1188. While node 1133 can not determine the total route, it can determine the best immediate link for each exchange. Node 1133 does not store the total route.

At this point, if a mobile (remote) user in Deerfield wants to use his telephone, node 1133 is in a position to route a call to Round Lake to the 546 prefix.

Call routing is now complete.

CALL CONNECTING AND CHANNEL ASSIGNMENT

The process of using the previously created routing information in conjunction with measured signal strengths that connects the call between nodes will now be explained.

In the example of FIG. 1 the mobile (remote) user in Deerfield wants to connect to phone number prefix 546 which is in the Round Lake exchange. The first step is for the Deerfield user to establish connection with a node near Deerfield with an acceptable signal quality and interference situation. This connection is established in a manner as described in U.S. Pat. No. 4,965,850 and improved in U.S. patent application Ser. No. 08/276,781 wherein several signal to interference tests are performed. In the example in FIG. 1, this radio connection is made with node 1133. Once this connection is established, the node 1133 now must begin the process of connecting the call to Round Lake. As explained above, node 1133 has in its memory the node it must contact to establish the first link in the route to Round Lake.

Refer now to FIG. 5 which shows, in additional detail, the communications paths between a mobile (remote) user in Deerfield and a drop near the exchange in Round Lake that handles the phone number prefix 546. As will be appreciated, the land drop will connect to the Round Lake exchange by standard land line methods.

The system and method for setting up a call from and to the first node from a mobile are described in U.S. Pat. No. 4,965,850. FIG. 5 shows the example of a call between a mobile (remote) user in Deerfield and an exchange drop in Round Lake that is being routed through a total of three different nodes. The new process of setting up the call between multiple nodes will be explained hereinbelow.

As indicated in FIG. 5, for the node to node communication bands, the odd nodes have transmitters which operate in the bands where the even nodes have receivers. Conversely, the odd nodes have receivers which operate in the bands where the even nodes have transmitters.

As will be more fully explained herein, the remote can originate communications on channel pair say 1 in bands G and H, and the communications from node 1133 to node 1188 will be on a channel pair say 14 in bands C and D, and the communications from node 1188 to node 1193 will on a channel pair say 17 in bands E and F, and the communications from node 1193 to the drop of exchange including prefix 546 will be on a channel pair say 3 in bands A and B.

Although the channels in the above tables and FIG. 5 are designated as voice channels, various data can be transmitted through such channels as is well known.

To establish the call connection and channel selection, the process follows a method similar to the method for establishing a call in U.S. Pat. No. 4,965,850 and improved in U.S. patent application Ser. No. 08/276,781. Tests are performed to ascertain that any channel choice will be both interference free and non interference causing. The channels chosen conform to the route as explained above.

The nodes add tones/ and or digital data streams to their ongoing conversations for node to node voice communications. These tones/data streams contain the following information.

1. Site number transmitting

2. Site number receiving

3. Signal strength being received.

Referring still to FIG. 5, the first step in the process is for the first node, in this case node 1133 located in Lincolnshire to establish a link with the next node. To facilitate this explanation, let us assume the following is the optimum route:

Table XXVII

Mobile user in Deerfield

Node 1133 located in Lincolnshire (Odd)

Node 1188 located in Libertyville (Even)

Node 1193 located in Grayslake (Odd)

Drop located in Round Lake

Exchange located in Round Lake

In the above table of routings the three intermediate nodes alternate between even and odd identification numbers.

The four interference tests are now performed to establish the first node to node link between node 1133 and node 1188.

Test 1 Will the transmission from node 1133 interfere with any other node receiver?

Test 2 Will node 1188 receive an interference free signal from node 1133?

Test 3 Will node 1188 interfere with any other node receiver?

Test 4 Will node 1133 receive an interference free signal?

As alluded to above, the node to node communications bands are Bands C,D,E,and F. The selection of a channel pair between node 1133 (Lincolnshire) and node 1188 (Libertyville), is independent of whether node 1133 received this routing demand from a remote or from another node. The routing and channel selection process works such that the routing and channel selection process originates with node 1133 and works towards node 1188 and node 1193.

Test 1

The Lincolnshire node 1133, which is an odd node, now must monitor the various channels with its scanning receiver in band D, to determine if it transmitted in Band C whether that transmission would interfere with any other node receiver. The computer controls the scanning receivers to sense the communication channels. These scanning receivers sense the tones and/or digital data streams that are present in ongoing communications.

The first step is the tentative selection by node 1133 of the lowest channel pair. Site 1133 monitors the receiver channel, and if it receives a signal on that channel, it decodes the signal information in the tones/digital data streams, and measures the signal strength of the received signal. Because of signal reciprocity, that is the concept that the propagation path has the same loss in both directions, node 1133 can calculate if it were to transmit in band C whether it would interfere with the paired receiver that is paired to the transmitter that node 1133 just decoded. If node 1133 discovers that it would cause interference on this tentative channel, then node 1133 steps to the next channel. The computer in node 1133 tunes its scanning receiver to the next channel.

If the channel pair is acceptable, the node 1133 (Lincolnshire) transmits on that channel pair a transmission indicating the number of the next node 1188 (Libertyville) in the route to the final destination for the call. Node 1133 also adds the desired phone number and the desired exchange to the message. This transmission is indicated in the spectrum usage table by the symbol Q. This transmission is repeated until terminated. The transmission includes the following:

| | |
|---|---|
| Originating Node | 1133 |
| Next Node in Routing | 1188 |
| Phone number of remote | YYYYYYYY |
| Desired Destination number | 708-546-XXXX |

Even though this channel has passed test one, it still has not passed the other three tests. Consequently, in the meantime, node 1133 (Lincolnshire) commences to step through the channels, and as it finds possibilities, turns on additional transmissions with tones and call information. This process of placing several transmissions on the air simultaneously, permits the next node 1188 (Libertyville) to have a overlapping system. A further advantage of this approach is that even though tests 2, 3, and 4 are not passed, the next node (Libertyville) will know it has a call coming because it has received a test signal from node 1133 (Lincolnshire), and it can begin the test 1 process in the alternate band towards node 1193 (Grayslake). Node 1188 (Libertyville) is an even numbered node, and consequently it will use bands E and F to communicate with 1193 (Grayslake). Consequently, it is possible that the 1188 (Libertyville) to 1193 (Grayslake) link might get a channel assignment before the 1133 (Lincolnshire) to 1188 (Libertyville) link is established.

In addition the node 1133 (Lincolnshire) adds a strong tone signal such as, for example, a 1,000 cycle tone to its transmission. The addition of this tone will help the receivers in the other node in the scanning process. Since they are looking for a tone of 1,000 cycles, they do not need to wait and decode all transmissions. Naturally, sometimes voice, faxes, or computer communications will trigger the scanning receiver that there is a potential transmission of interest, but many times various voice messages will be quickly skipped in that they do not contain the indicator tone.

Figure 12:
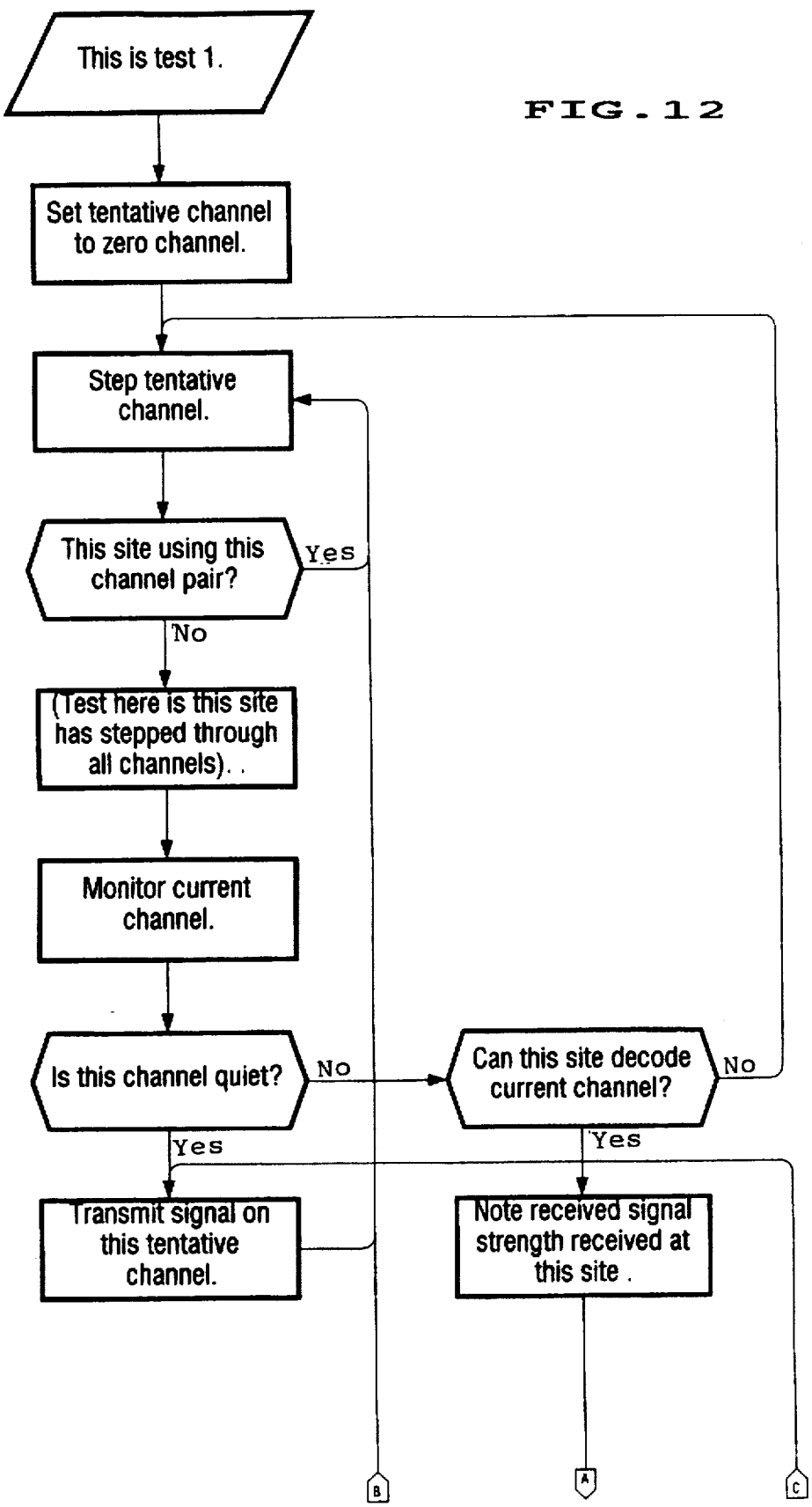
FIGS. 12 and 12A is a flow chart showing the steps in test 1.
Figure 12A:
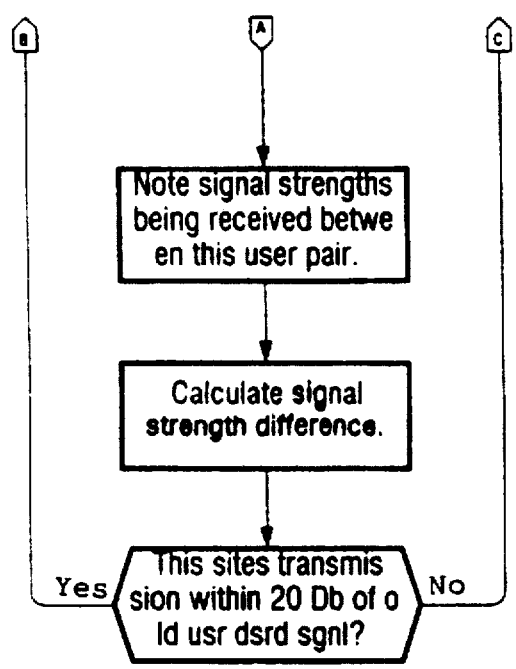

Refer to FIGS. 12 and 12A for a detailed flow chart of the logic of the first test.

Test 2

Node number 1188 (Libertyville) is always in the process of sequentially monitoring the channels in band C to determine if any odd nodes want to use number 1188 to set up a particular call. Site 1188 scans the band and searches for a tone of 1,000 cycles per second. If it hears a tone of 1,000 cycles per second, the node then must determine if this in reality is a signaling transmission from an odd numbered node. There is always the chance that selected music, voice, or faxes would create a strong tone at that frequency. If the scanning receiver hears a tone of 1,000 cycles, it decodes the message to ascertain if it is indeed a signal from test 1. This indicator tone permits the scanning receivers to move more quickly through the band.

If node 1188 decodes the signal, and discovers that it is indeed part of test 1, and that node 1188 is indicated to be part of an ongoing conversation, then node 1188 must begin two processes simultaneously.

The first process is to begin to perform test 1 on its transmit band E. When node 1188 (Libertyville) decodes the message from node 1133 (Lincolnshire), node 1188 (Libertyville) knows a call is coming. Node 1188 looks in its computer memory and notes that the next link to exchange 546 is node 1193 (Grayslake). Consequently, node 1188 (Libertyville) wants to alert node 1193 (Grayslake) that it is going to be part of a call destined for Round Lake. This transmission is similar to the transmission it just received in that it contains the node numbers and exchange number.

Node 1188 (Libertyville) also begins the second process of going through the remainder of the four tests to finally select a duplex channel pair that will pass all four interference tests.

To pass test 2, node 1188 only needs to determine that it will, in fact, receive a very good interference free signal on this channel.

Refer to FIG. 13 and 13A for a flow chart of the aforementioned procedure.

Test 3

Once node 1188 (Libertyville) determines that it will receive a good signal on the tentative channel, node 1188 must determine whether its transmission back to node 1133 would interfere with any other ongoing communication.

Node 1188 now monitors the same channel pair in the time period following the receipt of the signaling message. It could have been the case that 1188 received the signal on a totally quiet channel, or 1188 could have received a stronger signal that temporarily masked a weaker ongoing conversation. If the signal was weaker than an ongoing conversation, then node 1188 would not have decoded the signal. Since node 1133 and node 1188 are not located at the same place, they each hear a different set of ongoing conversations. Although there is some overlap in that node 1133 and node 1188 both could hear some conversations, many conversations can be heard by node 1188 that can not be heard by node 1133, and many conversations that can be heard by 1133 that can not be heard by 1188.

Node 1188 decodes any conversations that it hears looking for the sub-audible tones/data streams. Site 1188 also measures the signal strength for the concerned signals. Site 1188 can calculate if it were to transmit on the tentative channel, if it would cause interference at the receiver corresponding to the transmitter that it just decoded. Since node 1188 assumes signal strength reciprocity, it can calculate if it would cause interference in that the tones indicate the other receivers received signal strength.

If node 1188 determines that it would not cause interference to any ongoing communications, node 1188 signals node 1133 (Lincolnshire) that this test has passed.

Refer to FIG. 14 for a flow chart of the aforementioned logic.

Test 4

Once node 1188 (Libertyville) determines that it would not interfere with any other communication, it transmits back to 1133 (Lincolnshire) on the tentative channel.

If node 1133 (Lincolnshire) can not hear the transmission from node 1188 (Libertyville), it does not respond, and node 1188 tries another channel pair.

If node 1133 hears a good signal, then it accepts this channel pair, as all four tests have passed. The channel assignment is now accomplished.

Figure 15:
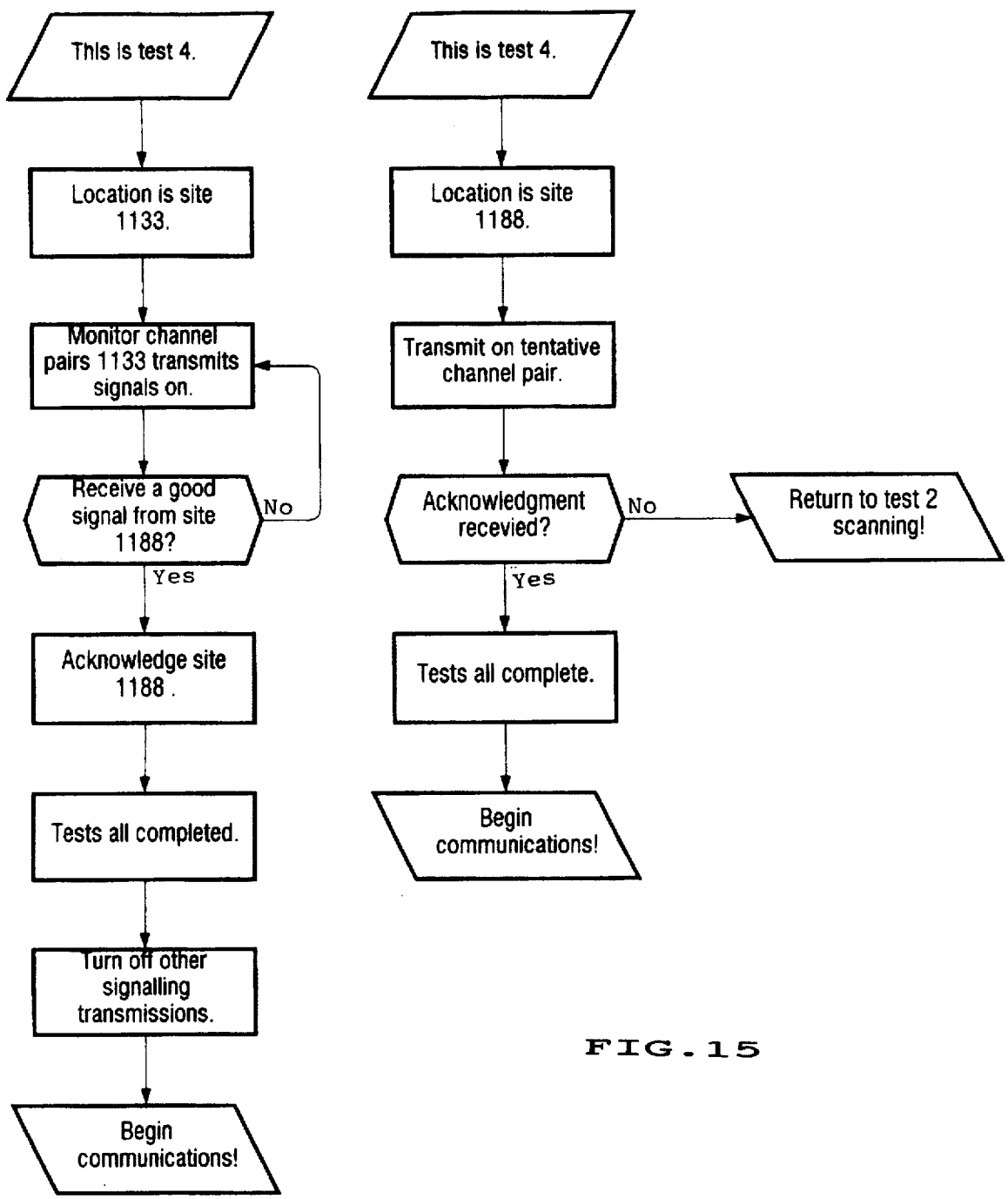
FIG. 15 is a flow chart showing the steps in test 4.

Refer to FIG. 15 for a flow chart of the aforementioned logic of test 4.

This completes the channel pair assignment for the link between node 1133 and 1188.

Channel Assignment in Next Links

The process that node 1188 (Libertyville) goes through to establish channel selections with node 1193 (Grayslake) are identical to the processes just described. However, since node 1188 is an even number node, it does its scanning and tentative transmissions in a different pair of bands. Site 1188 will tentatively transmit in band E and listen in band F.

Once the call reaches the final node 1193 (Grayslake), it is connected to the drop point near the Round Lake Exchange in a manner similar to that described in patent U.S. Pat. No. 4,965,850. However, the method in U.S. Pat. No. 4,965,850 describes a mobile initiating a call to a base.

If a node receives a connection from a remote that desires to communicate with a prefix that is not in the routing table, the node will connect the call to the drop with the least number of links in the route as described above. Since the computer in each node knows the number of links to each drop, the computer can choose a nearby drop. In effect when a call arrives for a new prefix, the computer has established a route to a nearby drop and the call is processed as above.

In most installations of the above system, the system will be installed in a single area code. However, to install a system in an area that is serviced by multiple area codes, the area code and the prefix must be utilized together as a single destination in the routing as described above.

Handoff for Embodiment C

Handoff for embodiment A has been described above. Handoff for embodiment C is similar to the handoff for embodiment A except that the various tests of U.S. Pat. No. 4,965,850 and the improved method in U.S. patent application Ser. No. 08/276,781 are used instead of the two procedures of embodiment A.

Embodiment D

Embodiment D is a modification of Embodiment B. Embodiment D uses the four tests to assign channels in the corporate complex system described in embodiment B.

While the invention has been particularly shown and described with reference to preferred embodiments thereof, it will be understood by those skilled in the art that various changes in form and details may be made therein without departing from the spirit and scope of the invention.

We claim:

1. In a radio telephone communications system comprising a plurality of nodes, remote users, and telephone exchange drops which have multiple telephone prefixes, a method of providing radio communications routing consisting of the steps of:

a) providing nodes of at least two different types designated such as odd and even, where odd nodes transmit on a first band of frequencies and receive on a second band and even nodes receive on said first band and transmit on said second band;

b) positioning said nodes in any pattern within a defined area;

c) segmenting said route into radio links between nodes and between nodes and drops;

d) providing a master time cycle having a plurality of time slots;

e) transmitting routing messages by each of said drops in uniquely assigned time slots;

f) establishing a route for radio communication to each exchange drop from each node based on the content and signal strength of said routing message;

g) setting a threshold level for message signals received by said nodes;

h) excluding any message signal to any node less than said threshold level;

i) establishing a listing at each node of the messages currently being received from the drops and the signal strength of the messages; and j) transmitting, in selected time slots, the messages that each node has received from said drops.

2. A method as in claim 1 further including the steps of:

a) sorting the listings at each node and each drop dependent on exchange designation to indicate possible routes, and the number of links between at least two nodes and a given drop; and b) finding for each route to a given drop, the link having the lowest signal strength, and if alternate routes are available deleting the route with the weakest link.

3. A radio telephone communications system having a plurality of nodes, remote users, and telephone drop points, radio links between nodes, radio links between remote users and nodes, and radio links between nodes and desired drop points, said system comprising:
   a) nodes of at least a first and a second type, said nodes being capable of communicating only with a node not of its same type, and said nodes being positioned in any selected pattern to provide a plurality of available communication routes from selected remote users to a desired drop point;
   b) a primary communication route being established from an operating remote user to a desired drop point by radio links provided via selected ones of said nodes;
   c) a secondary communication route being provided to a desired drop point via alternative nodes when said primary route is not functioning or is disabled; and,
   d) said communication routes being established based upon signal strength, node types and the number of intermediate nodes between the remote user and said drop point,
   whereby said node patterns provide more than one available communication route from an originating node to a desired drop.

4. A system as in claim 3 further comprising:
   a) means for making signal channel assignments; and
   b) means for making a series of tests involving measured signal strengths to determine that signals on said assigned channels are interference-free and non interference causing and assigning channels between each of the nodes in the route based on said determinations.

5. A system as in claim 3 further comprising
   a) means for establishing a route in response to routing messages and the signal strength of the messages received at each node; and,
   b) means for connecting a telephone call by assigning channels along a route based on the desired exchange drop and on signal to interference determinations.
   a) utilizing nodes positioned in any manner within a defined area;
   b) positioning exchange drops adjacent to telephone land line exchanges;
   c) transmitting by nodes and drops of routing message signals, and
   d) establishing a route for radio communication to each exchange drop from each node based on the content and signal strength of said routing message.

6. A radio communications system having a plurality of nodes, remotes, and drops, said nodes having radio transmitters and receivers that can communicate with other nodes and remote users, and selected nodes also communicating with drops, said system comprising:
   a) nodes of at least a first and a second type, said nodes being capable of providing communication links only with a node not of its same type, and said nodes being positioned in any selected pattern;
   b) said node pattern providing a plurality of available communication routes between selected initiating nodes to selected drops;
   c) means for transmitting routing messages containing destinations and node identifiers;
   d) means for establishing selected node to node links based on signal strength by deleting node to node links which have signal strength below a selected threshold;
   e) means for selecting, from various possible links, preferred links leading to selected destinations;
   f) means for establishing radio communication between a call initiating remote and an initiating node wherein said remote provides a destination identifier to said node; and
   h) means for assigning radio channels for each link along the route from the initiating remote to the desired drop from various available radio channels to create a usable communication connection from said initiating node to the desired drop,
   whereby said preferred links establish the preferred communication route.

7. A system as in claim 6 wherein said radio routing messages in clause c) are transmitted in unique time slots assigned to each node.

8. A system as in claim 6 wherein
   a) said drops are telephone exchanges; and
   b) said channel assignments are made in pairs for providing transmitting and receiving capabilities.

9. A system as in claim 6 wherein:
   a) preferred routes are selected to determine a route based on signal strength and the number of links in the route.

10. A system as in claim 6 wherein
    a) wherein said radio channels for said links are assigned based on a series of tests involving measured signal strengths to determine that signals on said assigned channels are interference-free and non interference causing.

* * * * *